(12) United States Patent
Xia et al.

(10) Patent No.: US 11,678,318 B2
(45) Date of Patent: Jun. 13, 2023

(54) METHOD AND APPARATUS FOR SUPPORTING SECTORIZATION COORDINATION

(71) Applicant: INTERDIGITAL PATENT HOLDINGS, INC., Wilmington, DE (US)

(72) Inventors: Pengfei Xia, San Diego, CA (US); Oghenekome Oteri, San Diego, CA (US); Hanqing Lou, Syosset, NY (US); Nirav B. Shah, San Diego, CA (US); Monisha Ghosh, Chicago, IL (US); Robert Olesen, Huntington, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 17/719,023

(22) Filed: Apr. 12, 2022

(65) Prior Publication Data

US 2022/0240239 A1 Jul. 28, 2022

Related U.S. Application Data

(63) Continuation of application No. 17/136,342, filed on Dec. 29, 2020, which is a continuation of application
(Continued)

(51) Int. Cl.
*H04B 7/0417* (2017.01)
*H04B 7/0491* (2017.01)
(Continued)

(52) U.S. Cl.
CPC ........ *H04W 72/046* (2013.01); *H04B 7/0417* (2013.01); *H04B 7/0491* (2013.01);
(Continued)

(58) Field of Classification Search
CPC ... H04W 72/046; H04W 16/28; H04W 84/12; H04B 7/0417; H04B 7/0491; H04B 7/0617; H04B 7/063; H04L 1/00
See application file for complete search history.

(56) References Cited

U.S. PATENT DOCUMENTS 7,415,288 B1 * 8/2008 Hou ...................... H04W 16/12
375/267
8,665,795 B2 3/2014 Ketchum et al.
(Continued)

*Primary Examiner* — Harry H Kim
(74) *Attorney, Agent, or Firm* — Volpe Koenig

(57) ABSTRACT

A method and apparatus may be used to support coordinated and cooperative sectorized transmissions. Power control and clear channel assessment for sectorized transmissions may be used, along with sectorized beacon and associated procedures. Transmissions in a network may be protected by a first access point (AP) sending an omni-directional transmission and a beamformed or sectorized transmission to a station (STA), an overlapping basic service set (OBSS) confirming a spatially orthogonal (SO) condition based on the omni-directional transmission, and a second AP monitoring the omni-directional transmission and confirming the SO condition. The STA may be configured to receive a request-to-send (RTS) frame indicating data is available for transmission, and transmit a cooperative sectorized (CS) clear-to-send (CTS) frame indicating an ability for multiple AP reception.

14 Claims, 15 Drawing Sheets

Related U.S. Application Data

No. 15/891,348, filed on Feb. 7, 2018, now Pat. No. 10,880,894, which is a continuation of application No. 14/904,227, filed as application No. PCT/US2014/046115 on Jul. 10, 2014, now abandoned.

(60) Provisional application No. 61/845,056, filed on Jul. 11, 2013.

(51) Int. Cl.
| | | |
|---|---|---|
| *H04B 7/06* | (2006.01) | |
| *H04L 1/00* | (2006.01) | |
| *H04W 16/28* | (2009.01) | |
| *H04W 84/12* | (2009.01) | |
| *H04W 72/044* | (2023.01) | |

(52) U.S. Cl.
CPC ........... *H04B 7/063* (2013.01); *H04B 7/0617* (2013.01); *H04L 1/00* (2013.01); *H04W 16/28* (2013.01)

(56) References Cited

U.S. PATENT DOCUMENTS

| | | | |
|---|---|---|---|
| 9,544,855 B2 | 1/2017 | Jeong et al. | |
| 9,748,989 B1 | 8/2017 | Freedman et al. | |
| 9,894,688 B2 | 2/2018 | Chae et al. | |
| 2004/0106437 A1* | 6/2004 | Ylitalo | H04W 52/42 342/368 |
| 2005/0181779 A1* | 8/2005 | Jones | H04W 48/16 455/552.1 |
| 2005/0277423 A1 | 12/2005 | Sandhu et al. | |
| 2006/0109865 A1* | 5/2006 | Park | H04W 16/12 370/208 |
| 2006/0203789 A1 | 9/2006 | Iacono et al. | |
| 2007/0060155 A1 | 3/2007 | Kahana et al. | |
| 2007/0087750 A1 | 4/2007 | Uchida | |
| 2009/0323654 A1* | 12/2009 | Nagata | H04W 84/18 455/446 |
| 2011/0211616 A1 | 9/2011 | Taghavi Nasrabadi et al. | |
| 2011/0275378 A1 | 11/2011 | Kwon et al. | |
| 2012/0040706 A1 | 2/2012 | Shin et al. | |
| 2012/0063439 A1 | 3/2012 | Seok | |
| 2012/0263126 A1 | 10/2012 | Choi et al. | |
| 2013/0012134 A1 | 1/2013 | Jin et al. | |
| 2013/0017794 A1 | 1/2013 | Kloper et al. | |
| 2013/0034074 A1* | 2/2013 | Ihm | H04W 72/046 370/329 |
| 2013/0039285 A1* | 2/2013 | Sorrentino | H04L 27/2613 370/329 |
| 2014/0056205 A1 | 2/2014 | Aboul-Magd et al. | |
| 2014/0153415 A1* | 6/2014 | Choudhury | H04W 24/00 370/252 |
| 2015/0029993 A1* | 1/2015 | Wu | H04L 27/2601 370/329 |
| 2015/0139156 A1 | 5/2015 | Thakur et al. | |
| 2015/0171939 A1* | 6/2015 | Davydov | H04W 60/04 370/329 |
| 2016/0095147 A1 | 3/2016 | Kim et al. | |
| 2016/0352396 A1 | 12/2016 | Seol et al. | |
| 2017/0257780 A1* | 9/2017 | Ryoo | H04B 7/0617 |

\* cited by examiner

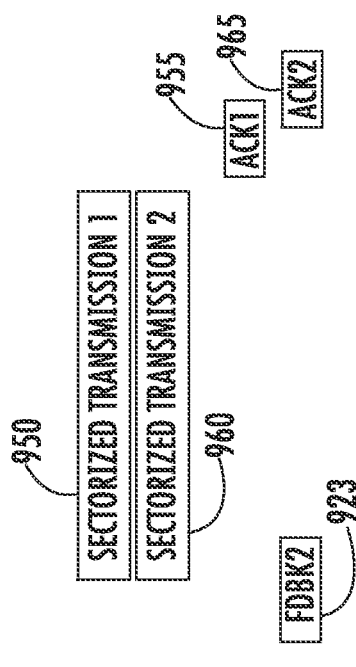
FIG. 9
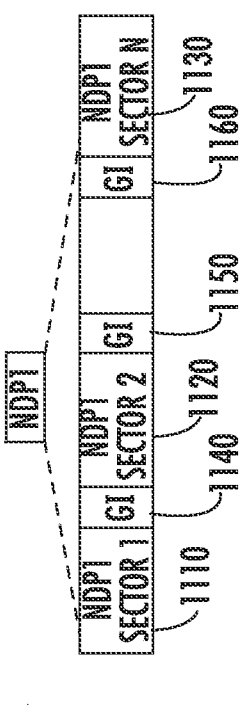
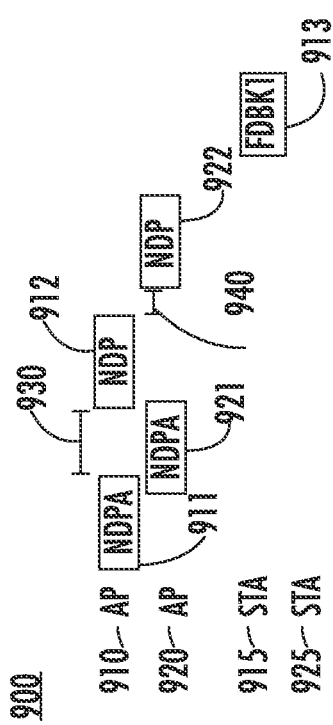
FIG. 10
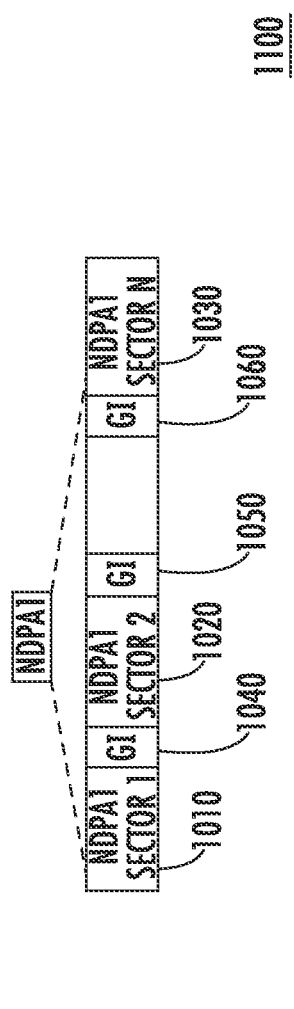
FIG. 11

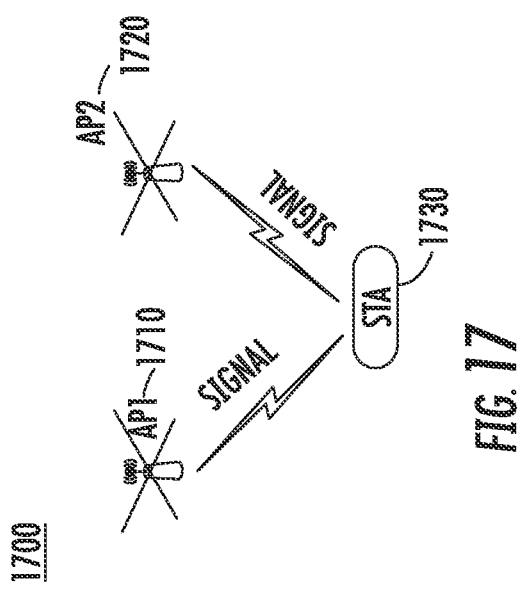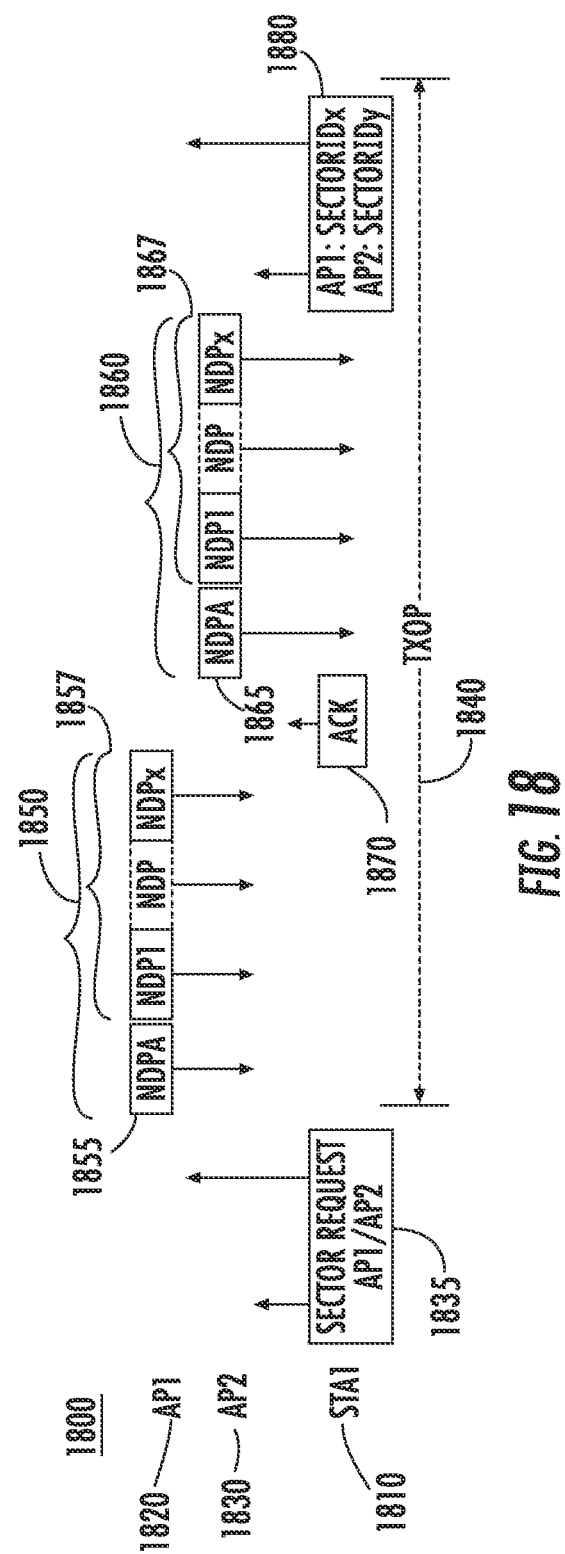

2300

| 2310 | 2320 | 2330 | 2340 | 2350 | 2360 |
|---|---|---|---|---|---|
| OPERATING CLASS | CHANNEL NUMBER | RANDOMIZATION INTERVAL | MEASUREMENT DURATION | SECTOR ID | OPTIONAL SUBELEMENTS |

| 2410 | 2420 | 2430 | 2440 | 2450 | 2460 |
|---|---|---|---|---|---|
| PEER MAC ADDRESS | RANDOMIZATION INTERVAL | MEASUREMENT DURATION | GROUP IDENTITY | SECTOR ID | OPTIONAL SUBELEMENTS |

FIG. 24

METHOD AND APPARATUS FOR SUPPORTING SECTORIZATION COORDINATION

CROSS REFERENCE TO RELATED APPLICATIONS

This application is a continuation of U.S. patent application Ser. No. 17/136,342 filed Dec. 29, 2020, which is a continuation of U.S. patent application Ser. No. 15/891,348 filed on Feb. 7, 2018, which issued on Dec. 29, 2020 as U.S. Pat. No. 10,880,894, which is a continuation of U.S. patent application Ser. No. 14/904,227 filed on Jan. 11, 2016, which is the U.S. National Stage, under 35 U.S.C § 371, of International Application No. PCT/US2014/046115 filed Jul. 10, 2014, which claims the benefit of U.S. Provisional Application No. 61/845,056 filed on Jul. 11, 2013, the contents of which are hereby incorporated by reference.

SUMMARY

A method and apparatus may be used to support coordinated and cooperative sectorized transmissions. Power control and clear channel assessment may be used for sectorized transmissions, along with sectorized beacons and associated procedures. Transmissions in a network may be protected by a first access point (AP) transmitting an omni-directional transmission and a beamformed or sectorized transmission to a station (STA), an overlapping basic service set (OBSS) confirming a spatially orthogonal (SO) condition based on the omni-directional transmission, and a second AP monitoring the omni-directional transmission and confirming the SO condition. The STA may be configured to receive a request-to-send (RTS) frame indicating data is available for transmission, and transmit a cooperative sectorized (CS) clear-to-send (CTS) frame indicating an ability for multiple AP reception.

BRIEF DESCRIPTION OF THE DRAWINGS

A more detailed understanding may be had from the following description, given by way of example in conjunction with the accompanying drawings wherein:

FIG. 9 is a diagram of an example coordinated sectorized transmission;

FIG. 10 is a diagram of an example NDPA frame using multiple sectors that may be used in an omni-directional transmission;

FIG. 11 is a diagram of an example NDP frame using multiple sectors that may be used in an omni-directional transmission;

FIG. 17 is a diagram of an example cooperative sectorized (CS) transmission;

FIG. 18 is a diagram of an example STA-requested multi-AP training and feedback procedure;

FIG. 21 is a diagram of an example procedure where an AP may be configured to set its transmit power to ensure that a STA is not interfered with;

FIG. 23 is a diagram of an example measurement request response field; and

FIG. 24 is a diagram of an example STA statistics request response field.

DETAILED DESCRIPTION

Figure 1A:
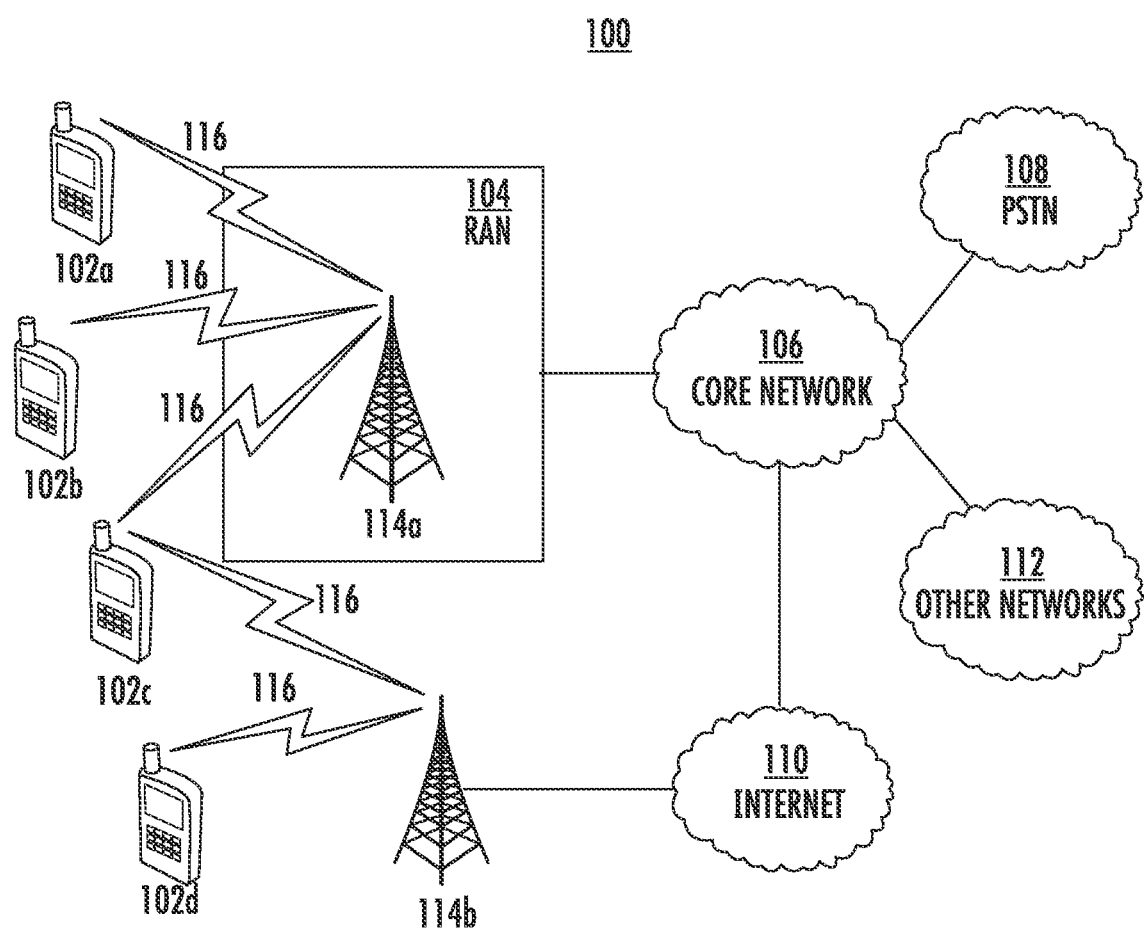
FIG. 1A shows an example communications system in which one or more disclosed embodiments may be implemented.

FIG. 1A shows an example communications system 100 in which one or more disclosed embodiments may be implemented. The communications system 100 may be a multiple access system that provides content, such as voice, data, video, messaging, broadcast, and the like, to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include WTRUs 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a station (STA), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an evolved Node-B (eNB), a Home Node-B (HNB), a Home eNB (HeNB), a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link, (e.g., radio frequency (RF), microwave, infrared (IR), ultraviolet (UV), visible light, and the like). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as universal mobile telecommunications system (UMTS) terrestrial radio access (UTRA), which may establish the air interface 116 using wideband CDMA (WCDMA). WCDMA may include communication protocols such as high-speed packet access (HSPA) and/or evolved HSPA (HSPA+). HSPA may include high-speed downlink packet access (HSDPA) and/or high-speed uplink packet access (HSUPA).

In another embodiment, the base station 114a and the WTRUs 102a, 102b, 102c may implement a radio technology such as evolved UTRA (E-UTRA), which may establish the air interface 116 using long term evolution (LTE) and/or LTE-Advanced (LTE-A).

In other embodiments, the base station 114a and the WTRUs 102a, 102b, 102c may implement radio technologies such as IEEE 802.16 (i.e., worldwide interoperability for microwave access (WiMAX)), CDMA2000, CDMA2000 1x, CDMA2000 evolution-data optimized (EV-DO), Interim Standard 2000 (IS-2000), Interim Standard 95 (IS-95), Interim Standard 856 (IS-856), global system for mobile communications (GSM), enhanced data rates for GSM evolution (EDGE), GSM/EDGE RAN (GERAN), and the like.

The base station 114b in FIG. 1A may be a wireless router, HNB, HeNB, or AP, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT, (e.g., WCDMA, CDMA2000, GSM, LTE, LTE-A, and the like), to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over Internet protocol (VoIP) services to one or more of the WTRUs 102a, 102b, 102c, 102d. For example, the core network 106 may provide call control, billing services, mobile location-based services, pre-paid calling, Internet connectivity, video distribution, and the like, and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the Internet protocol (IP) in the TCP/IP suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
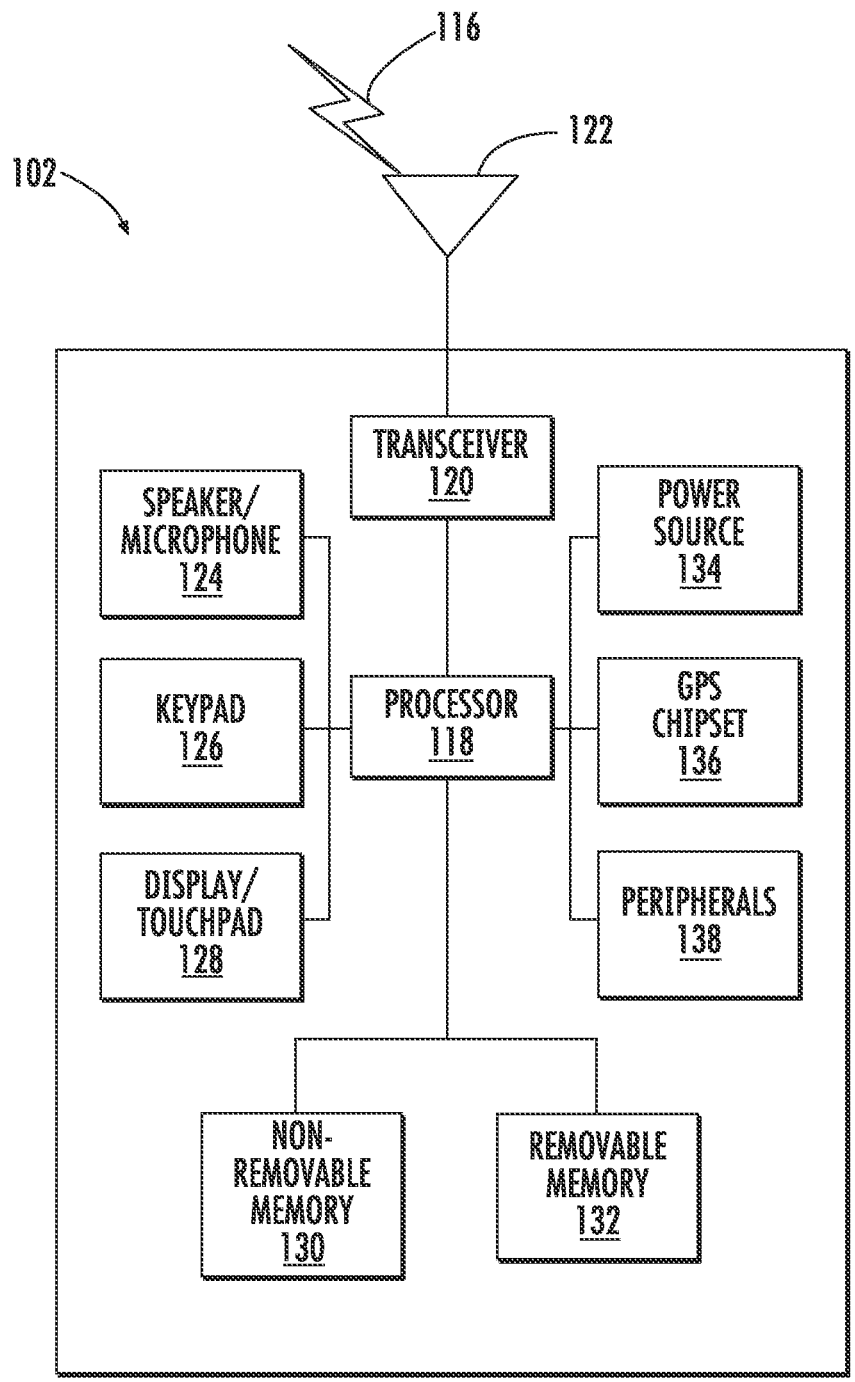
FIG. 1B shows an example wireless transmit/receive unit (WTRU) that may be used within the communications system shown in FIG. 1A.

FIG. 1B shows an example WTRU 102 that may be used within the communications system 100 shown in FIG. 1A. As shown in FIG. 1B, the WTRU 102 may include a processor 118, a transceiver 120, a transmit/receive element, (e.g., an antenna), 122, a speaker/microphone 124, a keypad 126, a display/touchpad 128, a non-removable memory 130, a removable memory 132, a power source 134, a global positioning system (GPS) chipset 136, and peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a microprocessor, one or more microprocessors in association with a DSP core, a controller, a microcontroller, an application specific integrated circuit (ASIC), a field programmable gate array (FPGA) circuit, an integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. The transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122, (e.g., multiple antennas), for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station, (e.g., base stations 114a, 114b), and/or determine its location based on the timing of the signals being received from two or more nearby base stations. The WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
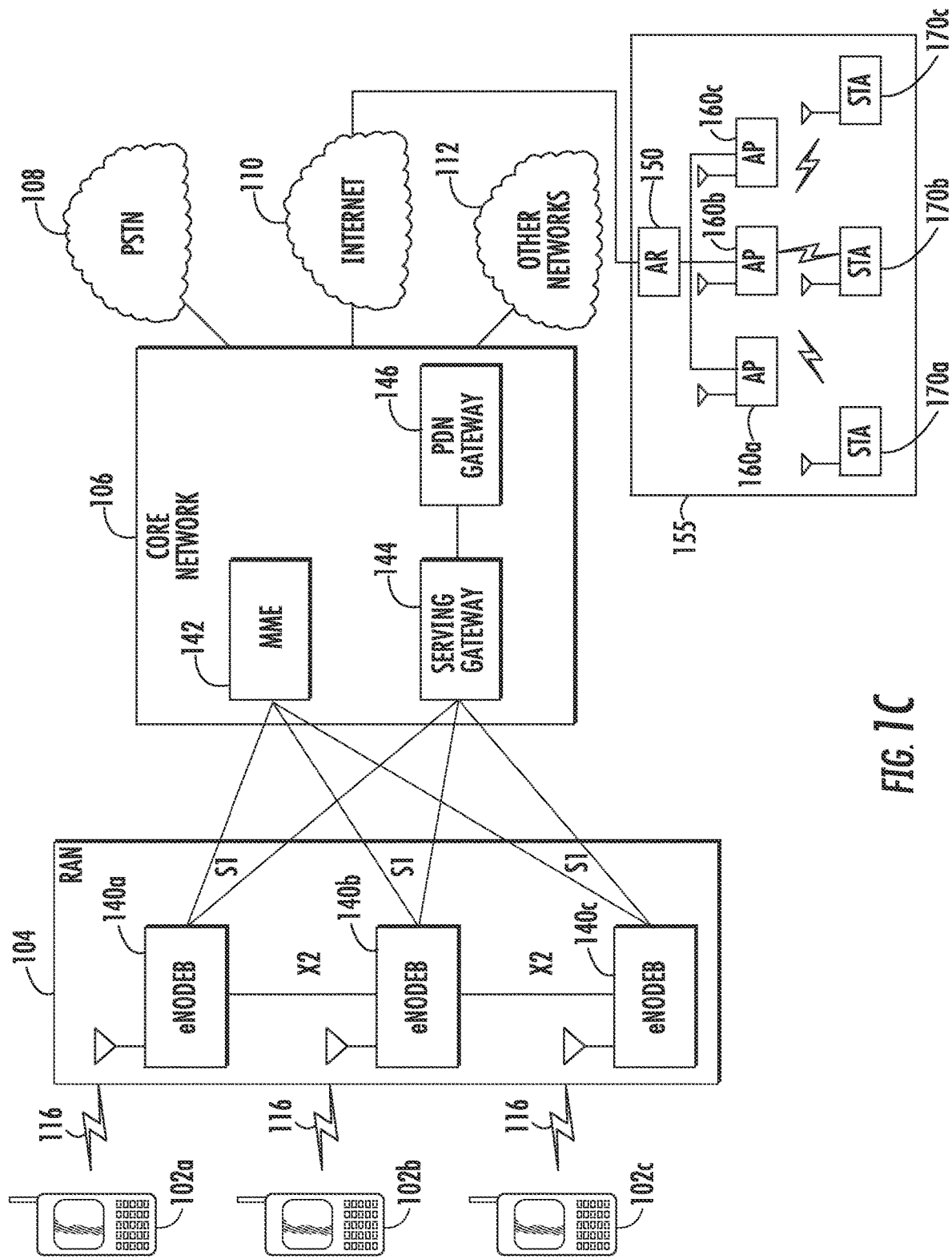
FIG. 1C shows an example radio access network and an example core network that may be used within the communications system shown in FIG. 1A.

FIG. 1C shows an example RAN 104 and an example core network 106 that may be used within the communications system 100 shown in FIG. 1A. As noted above, the RAN 104 may employ E-UTRA radio technology to communicate with the WTRUs 102a, 102b, 102c over the air interface 116.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices. An access router (AR) 150 of a wireless local area network (WLAN) 155 may be in communication with the Internet 110. The AR 150 may facilitate communications between APs 160a, 160b, and 160c. The APs 160a, 160b, and 160c may be in communication with STAs 170a, 170b, and 170c.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers A WLAN in infrastructure BSS mode may have an AP for the BSS and one or more STAs associated with the AP. The AP may have access or interface to a DS or another type of wired/wireless network that carries traffic in and out of the BSS. Traffic to STAs that originates from outside the BSS may arrive through the AP and may be delivered to the STAs. Traffic originating from STAs to destinations outside the BSS may be sent to the AP to be delivered to the respective destinations. Traffic between STAs within the BSS may also be sent through the AP, where the source STA sends traffic to the AP, and the AP delivers the traffic to the destination STA. Traffic between STAs within a BSS may be referred to as peer-to-peer traffic, which may also be sent directly between the source and destination STAs with a direct link setup (DLS) using an IEEE 802.11e DLS or an IEEE 802.11z tunneled DLS (TDLS). A WLAN using an independent BSS (IBSS) mode may not have an AP, and/or STAs, communicating directly with each other. This mode of communication may be referred to as an "ad-hoc" mode of communication.

Using the IEEE 802.11 infrastructure mode of operation, the AP may transmit a beacon on a fixed channel, usually the primary channel. This channel may be 20 MHz wide, and may be the operating channel of the BSS. This channel may also be used by the STAs to establish a connection with the AP. The fundamental channel access mechanism in an IEEE 802.11 system may be carrier sense multiple access with collision avoidance (CSMA/CA). In this mode of operation, every STA, including the AP, may sense the primary channel. If the channel is detected to be busy, the STA may back off. Hence, only one STA may transmit at any given time in a given BSS.

In IEEE 802.11n, high throughput (HT) STAs may also use a 40 MHz wide channel for communication. This may be achieved by combining the primary 20 MHz channel with an adjacent 20 MHz channel to form a 40 MHz wide contiguous channel. IEEE 802.11n may operate on a 2.4 GHz and a 5 GHz industrial, scientific and medical (ISM) band.

In IEEE 802.11ac, very high throughput (VHT) STAs may support 20 MHz, 40 MHz, 80 MHz, and 160 MHz wide channels. The 40 MHz and 80 MHz, channels may be formed by combining contiguous 20 MHz channels similar to IEEE 802.11n described above. A 160 MHz channel may be formed either by combining 8 contiguous 20 MHz channels, or by combining two non-contiguous 80 MHz channels. This may be referred to as an 80+80 configuration. For the 80+80 configuration, the data, after channel encoding, may be passed through a segment parser that divides it into two streams. Inverse fast Fourier transform (IFFT) and time domain processing may be performed on each stream separately. The streams may then be mapped on to the two channels, and the data may be transmitted. At the receiver, this mechanism may be reversed, and the combined data may be sent to the medium access control (MAC) layer. IEEE 802.11ac may operate on a 5 GHz ISM band.

Sub 1 GHz modes of operation may be supported by IEEE 802.11af, and IEEE 802.11ah, whereby the channel operating bandwidths are reduced relative to those used in IEEE 802.11n and IEEE 802.11ac. IEEE 802.11af may support 5 MHz, 10 MHz and 20 MHz bandwidths in the television (TV) white space (TVWS) spectrum, and IEEE 802.11ah may support 1 MHz, 2 MHz, 4 MHz, 8 MHz, and 16 MHz bandwidths using a non-TVWS spectrum. A possible use case for IEEE 802.11ah may be to support for machine type communication (MTC) devices in a macro coverage area. MTC devices may have limited capabilities including only support for limited bandwidths, but also may include a requirement for a very long battery life.

In IEEE 802.11ad, wide bandwidth spectrum at 60 GHz may be available, thus enabling VHT operation. IEEE 802.11ad may support up to 2 GHz operating bandwidths, whereby the data rate may reach up to 6 Gbps. The propagation loss at 60 GHz may be more significant than at the 2.4 GHz and 5 GHz bands. Therefore, beamforming in 802.11ad may extend the coverage range. To support the receiver requirements for this band, the IEEE 802.11ad MAC layer may be modified in several areas. One significant modification to the MAC may include procedures to allow channel estimation training, including omni and beamformed modes of operation, which may not exist in IEEE 802.11ac.

WLAN systems which support multiple channels and channel widths, such as IEEE 802.11n, IEEE 802.11ac, IEEE 802.11af and IEEE 802.11ah, may include a channel which is designated as the primary channel. The primary channel may have a bandwidth equal to the largest common operating bandwidth supported by all STAs in the BSS. The bandwidth of the primary channel may be limited by the STA, of all STAs in operating in a BSS, which may support the smallest bandwidth operating mode. In the example of IEEE 802.11ah, the primary channel may be 1 MHz wide if there are STAs, (e.g., MTC type devices), that only support a 1 MHz mode even if the AP, and other STAs in the BSS, may support a 2 MHz, 4 MHz, 8 MHz, 16 MHz, or other channel bandwidth operating modes. All carrier sensing, and network allocation vector (NAV) settings, may depend on the status of the primary channel. For example, if the primary channel is busy due to a STA supporting only a 1 MHz operating mode while is transmitting to the AP, then the entire available frequency bands may be considered busy even though a majority of the bands stays idle and available.

In the United States, the available frequency bands which may be used by IEEE 802.11ah may include 902 MHz to 928 MHz frequency bands. In Korea, the available frequency bands which may be used by IEEE 802.11ah may include 917.5 MHz to 923.5 MHz frequency bands. In Japan, the available frequency bands which may be used by IEEE 802.11ah may include 916.5 MHz to 927.5 MHz frequency bands. The total bandwidth available for IEEE 802.11ah may be 6 MHz to 26 MHz, depending on the country code. Accordingly, the available frequency bands may be different, depending upon the country. However, discussion of a particular frequency band is not intended to limit the procedures and apparatus described herein.

A wireless local area network (WLAN) in infrastructure basic service set (BSS) mode may have an access point (AP) for the BSS and one or more stations (STAs) associated with the AP. The AP may have access or interface to a distribution system (DS) or another type of wired/wireless network that carries traffic in and out of the BSS. Traffic to STAs that originates from outside the BSS may arrive through the AP and may be delivered to the STAs. Traffic originating from STAs to destinations outside the BSS may be sent to the AP to be delivered to the respective destinations. Traffic between STAs within the BSS may also be sent through the AP, where the source STA sends traffic to the AP, and the AP delivers the traffic to the destination STA.

To enable improved cell coverage, and improved spectral efficiency, it may be desirable to consider coordination between APs for joint and coordinated transmission to STAs. In particular, when each AP is equipped with multiple sectorized antennas to cover different sectors, it may be beneficial to allow multiple APs to transmit at the same time to each of its own group of STAs. Simultaneous transmission from multiple APs may improve the area spectral efficiency of the underlying wireless network.

Careful system designs may be needed to guarantee that the multiple simultaneous transmissions do not interfere with each other at the receiver sides. Methods may be implemented to enable multiple APs to coordinate with each other using sectorized antennas.

Sectorization in WLAN systems may be implemented in accordance with IEEE 802.11ah and IEEE 802.11ad. An IEEE 802.11ah AP may conduct sectorized transmissions, while an IEEE 802.11 non-AP may conduct omni-directional transmissions.

Figure 2:
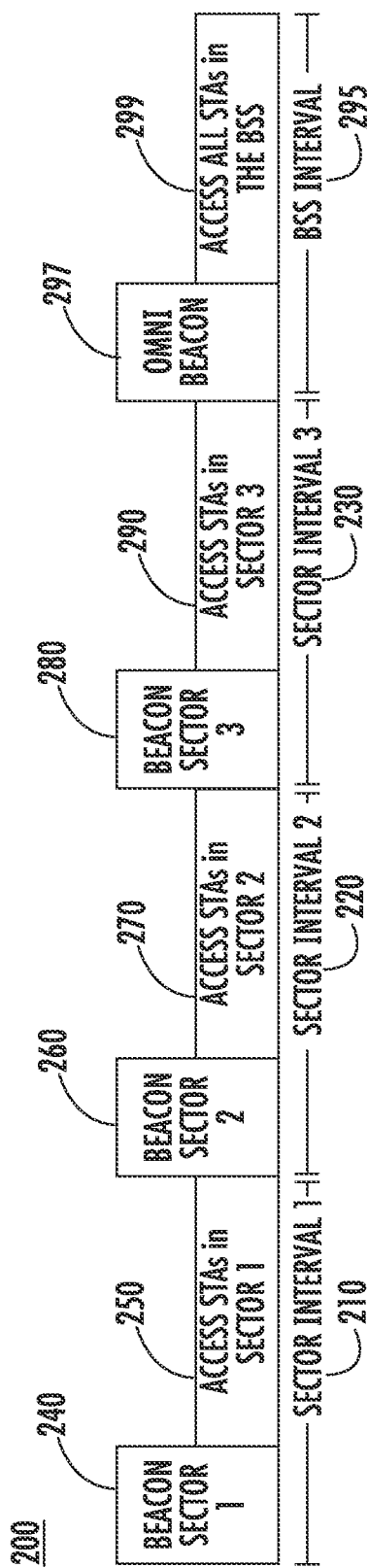
FIG. 2 is a diagram of an example type 0 sectorization in IEEE 802.11ah used for hidden node mitigation.

FIG. 2 is a diagram of an example type 0 sectorization 200 in IEEE 802.11ah used for hidden node mitigation. An AP may divide the space in multiple sectors, for example, sector interval 1 210, sector interval 2, 220, and sector interval 3 230, and use a time division multiplexing (TDM) approach to allow STA transmissions in one sector at a time. STAs may be allowed to transmit and receive data only in the time interval corresponding with their sector. For example, sector interval 1 210 may include a beacon transmission sector 1 240 and an access STA sector 1 250, sector interval 2 220 may include a beacon transmission sector 2 260 and an access transmission sector STA 2 270, and sector interval 3 may include a beacon transmission sector 3 280 and an access transmission sector STA 3 290. Some of the time intervals may be left for channel access to all sectors at the same time, for example in a BSS interval 295. In this example, BSS interval 295 may include an omni-transmission beacon 297, and a portion allocated to access all STAs in the BSS 299.

For type 1 sectorized beam operation, the AP may transmit and receive using omni-transmission beams (omni beams) and sectorized-transmission beams (sectorized beams). The AP may alternate between a sectorized beam and an omni-beam. A sectorized beam may be used when the AP is aware of the best sector for communications with a STA, or in a scheduled transmission, such as during a restricted access window (RAW) or during a transmission opportunity (TXOP) of a STA. Otherwise, or following this procedure, the AP may switch back to an omni-beam operation and procedure.

A sectorized transmit beam may be used in conjunction with a sectorized receive beam. The AP may associate a STA with a specific group using a Group ID, for example the association may be related to the same sector/group identity (ID) based on the best sector for communications with the STA.

Figure 3:
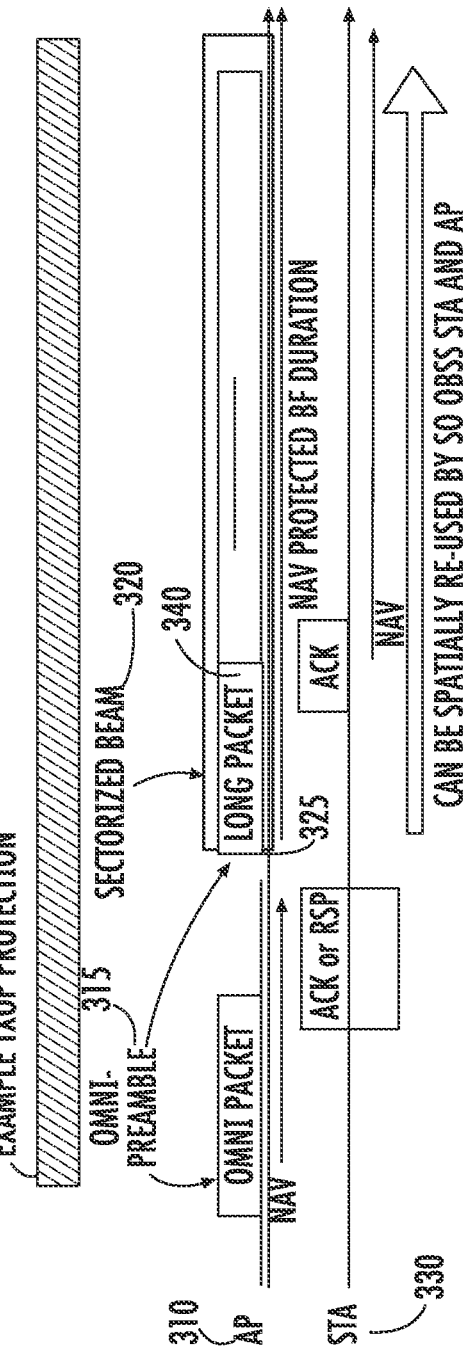
FIG. 3 is a diagram of an example spatially orthogonal (SO) condition 1 whereby an AP may use an omni-preamble to set up TXOP protection for a sectorized beam transmission.

Four spatially orthogonal (SO) conditions may be used for type 1 sectorized operations. FIG. 3 is a diagram of an example 300 of a SO condition 1 whereby an AP 310 may use an omni-preamble 315 to set up TXOP protection for the sectorized beam transmission 320. An omni-preamble may be a preamble that is transmitted with an omni-directional antenna such that all the STAs in the BSS may receive it. Once the proper TXOP protection is set up with a long preamble 325, the sectorized beam transmission 320 may be used for the remainder of the TXOP. The long preamble 325 may be greater than or equal to 2 MHz, and may be used for both single user (SU) and multi-user (MU) transmissions. The long preamble 325 may be used for a long packet frame format 340. The long packet frame format 340 may be used for SU and MU beamformed transmission using 2 MHz, 4 MHz, 8 MHz, and 16 MHz PPDUs. The structure of the long preamble 325 may be a mixed format structure. The sectorized beam transmission 320 may performed using Greenfield beamforming (BF). The Greenfield BF may be a non-backwards compatible beamforming that may be used in 802.11ah, for example. SO condition 1 may be confirmed by an overlapping BSS (OBSS) STA/AP (not shown) not receiving a transmission from STA 330. Referring to FIG. 3, an OBSS STA may expect a following STA transmission when it detects a positive acknowledgement (ACK) indicator (Ind)=00, 10, Ack Ind=11/Ack Policy=00 in the AP omni-transmission packet, and the sectorized-transmission portion of AP 310 within the long packet 325.

Figure 4:
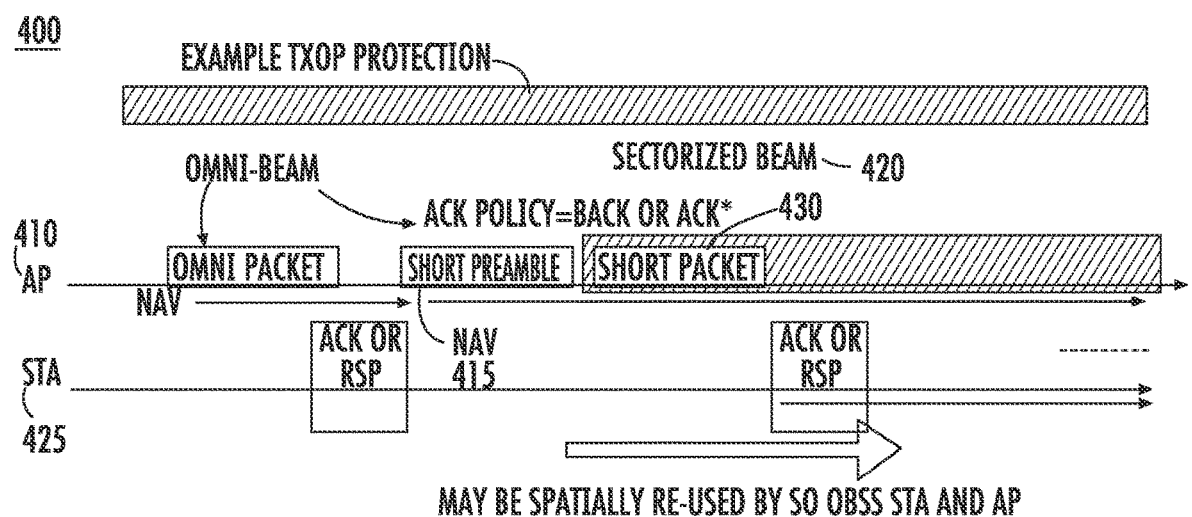
FIG. 4 is a diagram of an example SO condition 2.

FIG. 4 is a diagram of an example 400 of a SO condition 2. An AP 410 may use a short preamble 415 with an omni-directional transmission to set up TXOP protection for the sectorized beam transmission 420. The short preamble 415 may be greater than or equal to 2 MHz, and may be used for SU transmissions. The short preamble 415 may be used for a short packet frame format 430. The short packet frame format 430 may be used for SU transmissions using 2 MHz, 4 MHz, and 16 MHz PPDUs. As shown in FIG. 4, the TXOP protection may be set up at the second transmission by the AP. Once the proper TXOP protection is set up, the sectorized transmission 420 may be used for the remainder of the TXOP. The sectorized transmission 420 may be performed using Greenfield BF. SO condition 2 may be confirmed by an OBSS STA/AP (not shown) not receiving a transmission from a STA 425. Referring to FIG. 4, the OBSS STA may expect a following STA 425 transmission when it detects Ack Ind=00, 10, or Ack Ind=11/Ack Policy=00 in the AP1 omni packet, and the sectorized transmission of AP 410 following the omni packet with ACK Policy=Block Ack.

Figure 5A:
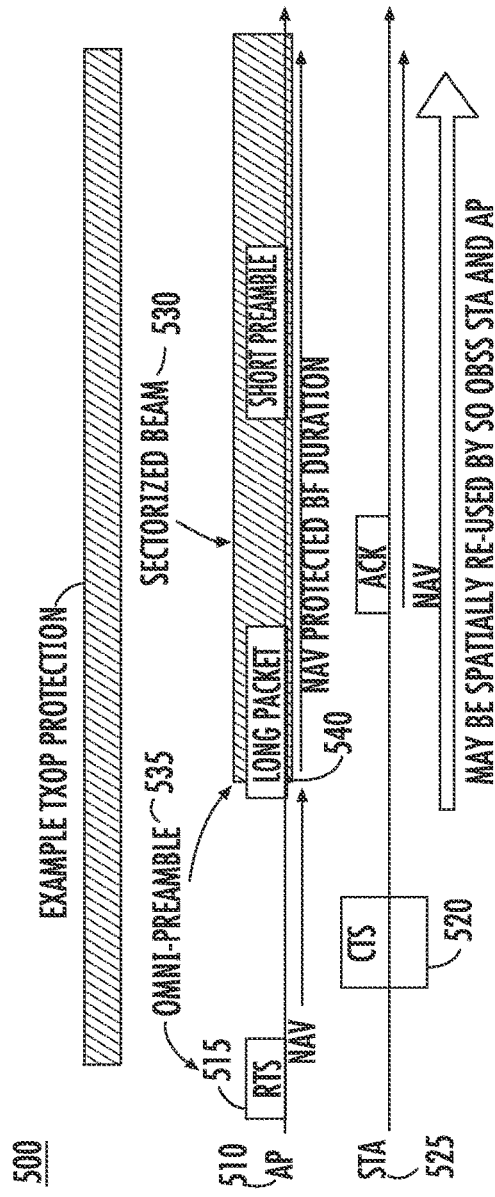
FIGS. 5A and 5B are diagrams of an example SO condition 3.
Figure 5B:
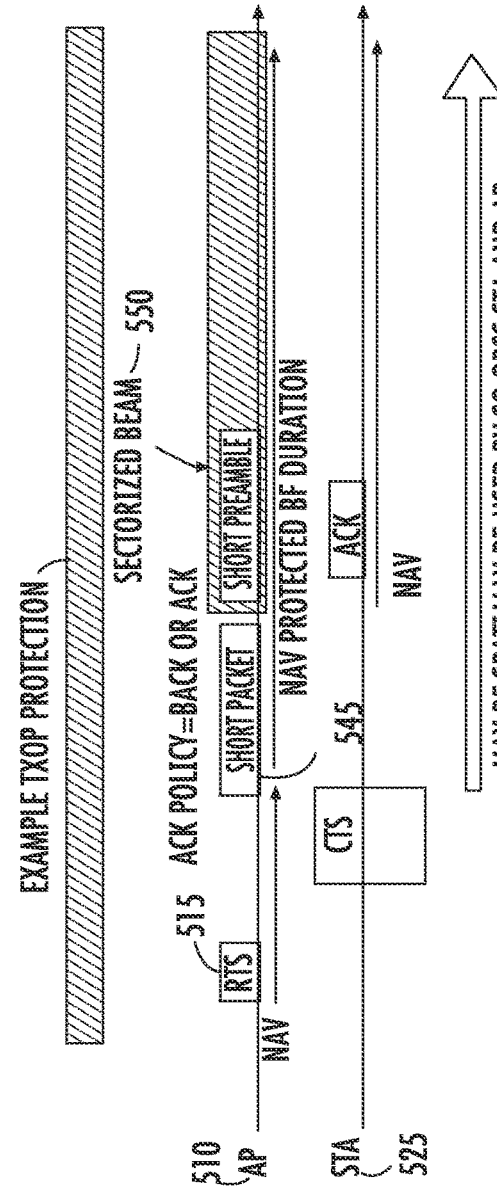

FIGS. 5A and 5B are diagrams of an example 500 of a SO condition 3. An AP 510 may start a frame exchange by transmitting an omni-request-to-send (RTS) packet 515 to solicit a clear-to-send (CTS) packet 520 in response from a STA 525, and then may use the omni-directional transmission to set up the protection for the duration of the sectorized beam transmission and the switch to the sectorized beam transmission 530 for the remainder of the protected duration. The SO condition may be confirmed by an OBSS STA or AP which observes the omni-directional transmission of the AP, but not the beamformed transmission of the AP, and not the station's transmission. An OBSS STA or OBSS AP may infer its spatial orthogonality with the AP 510 by observing the omni-transmitted-RTS 515 and omni-transmitted-preamble 535 of the long packet 540, but not the subsequent sectorized beam transmission. In this example, the omni-transmitted-preamble 535 of the long packet 540 may be a long preamble. An OBSS STA or OBSS AP may infer its spatial orthogonality with the STA by observing a gap of no transmission between the omni-transmitted-RTS 515 and the omni-transmitted-preamble of the long packet 540. Alternatively, as shown in FIG. 5B, an OBSS STA or OBSS AP may infer its spatial orthogonality with the AP 510 by observing the omni-transmitted-RTS 515 and the omni-transmitted short packet transmission 545, but not observing the subsequent sectorized beam transmission 550. The omni-transmitted short packet transmission 545 may include a short preamble. An OBSS STA or OBSS AP may infer its spatial orthogonality with the STA 525 by observing a gap of no transmission between the omni-transmitted-RTS 515 and the omni-beam short packets 545 by the AP 510.

Figure 6A:
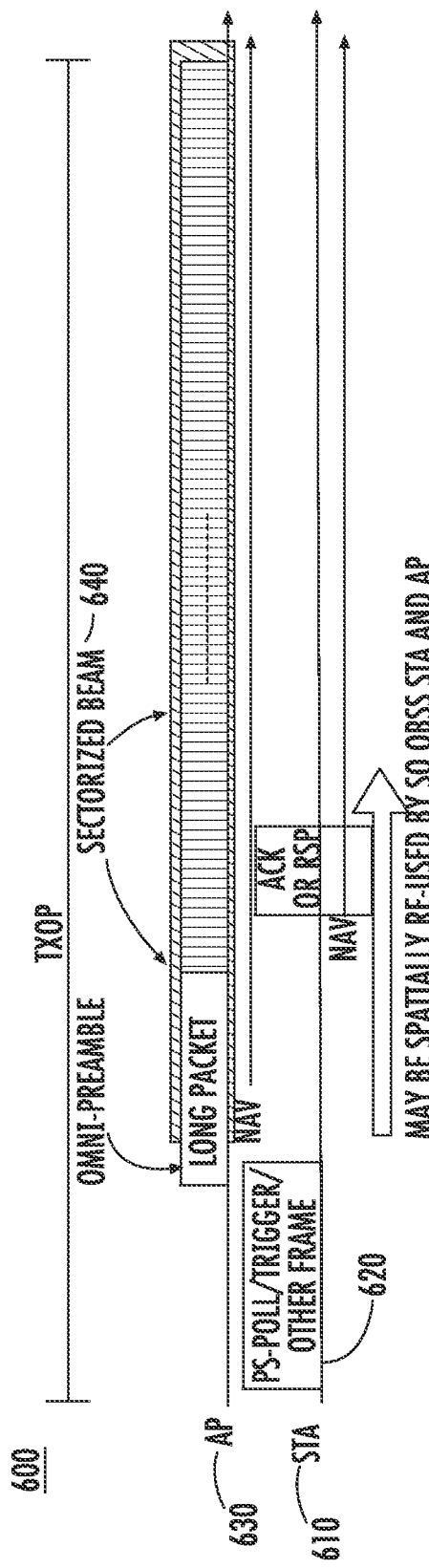
FIGS. 6A and 6B are diagrams of an example SO condition 4.
Figure 6B:
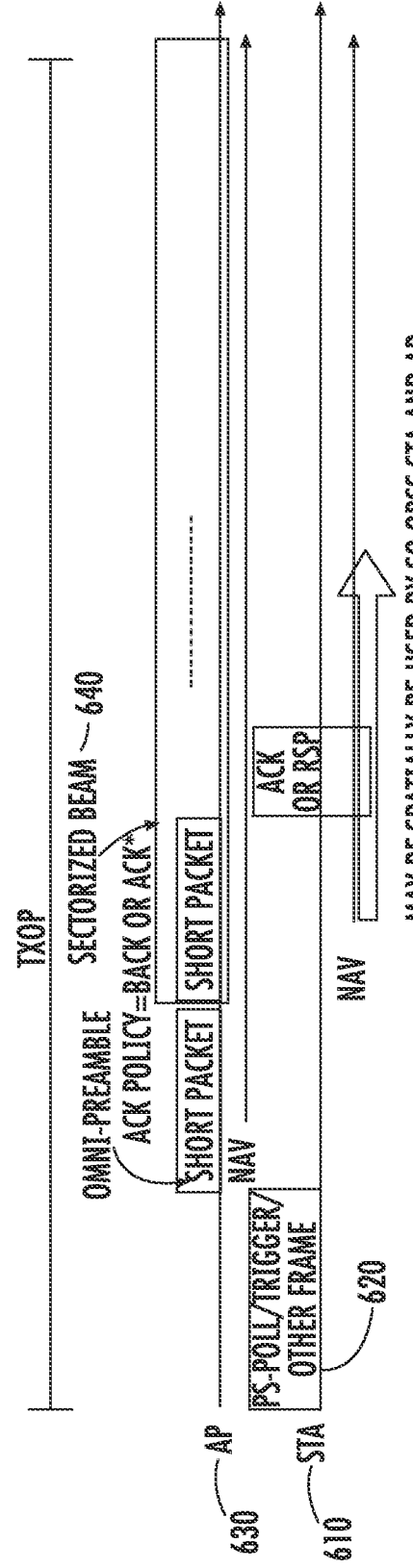

FIGS. 6A and 6B are diagrams of an example 600 of a SO condition 4. In FIGS. 6A and 6B, a STA 610 may transmit a frame 620 to set up TXOP protection. The frame 620 may be, for example, a PS-Poll frame, a trigger frame, or any other frame. When the TXOP protection is set up by omni-directional transmission for a duration within a TXOP, and if the SO condition is confirmed by an OBSS STA/AP, the OBSS STA/AP may cancel its NAV to initiate a new SO exchange starting with a non-BF RTS/CTS. Once an AP 630 switches to the sectorized beam transmission 640 during an exchange, it may continue with Greenfield sectorized beam transmission for the remainder of the protected duration.

An SO condition may be defined as a OBSS STA/AP which receives the omni-transmission but not the sectorized transmission from the AP, (which may be either the TXOP holder or responder), and not the transmission from the STA, (which may be either the TXOP responder or holder).

Figure 7:
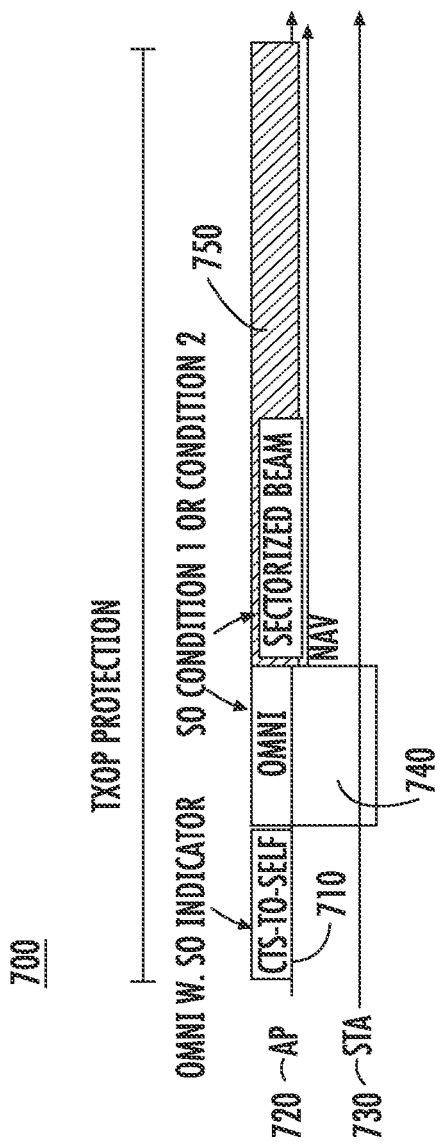
FIG. 7 is a diagram of an example of facilitating SO detection by transmitting a clear-to-send (CTS)-to-self packet.

FIG. 7 is a diagram of an example 700 of facilitating SO detection by transmitting a clear-to-send (CTS)-to-self packet. In this example, Information elements (IEs) for Type 0 and Type 1 sectorization may include a 1-bit sector ID indicator in the CTS-to-self packet 710, and may precede SO conditions 1 or 2, to facilitate the detection of the SO conditions. In this example, an AP 720 may transmit a CTS-to-self packet 710 to set up TXOP protection. The CTS-to-self packet 710 may be an omni-transmission, and may include a spatial orthogonality indicator to facilitate the discovery of SO conditions. STA 730 may receive the CTS-to-self packet 710. STA 730 may also receive an omni-transmission 740. In this example, the STA 730 may not receive the sectorized beam transmission 750 since the sectorized beam transmission 750 may be spatially orthogonal.

Figure 8:
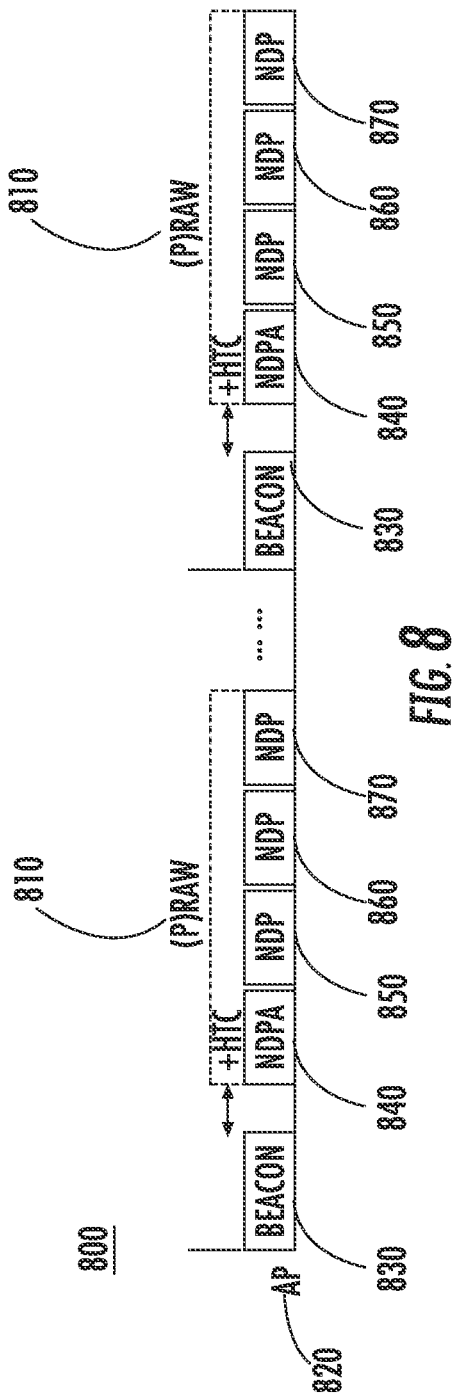
FIG. 8 is a diagram of an example 800 of periodic sector training method.

FIG. 8 is a diagram of an example 800 of periodic sector training method. For each periodic restricted access window (PRAW) 810, the AP 820 may transmit a beacon frame 830 followed by a number of training packets. The training packets may include a null-data-packet-announcement frame (NDPA) 840 and one or more null data packet (NDP) frames 850, 860, 870. Different NDP frames may be transmitted using different sectorizations while the NDPA frame 840 may be transmitted in an omni-directional manner. The purpose of the NDPA frame 840 may be to announce ensuing NDP frames to allow STAs to prepare for reception. The NDP frames 850, 860, 870 may be used by the STAs to measure channel strength for different sectorizations such that each STA may report the best sectorization at a later time.

In IEEE 802.11ad, STAs and APs may conduct sectorized beam transmissions. A beamformed TXOP may be reserved by a source STA or AP by transmitting one or more beamformed RTS directional multi-gigabits (DMG) CTS frames. The STAs that receive the RTS/DMG CTS may obey their NAVs. A recipient DMG STA which receives a valid RTS from the source STA or AP during a Service Period (SP) may also transmit a DMG denial-to-send (DTS) to tell the source STA or AP to postpone transmissions if one of the NAV timers at the recipient STA is non-zero.

A personal BSS (PBSS) control point (PCP) may request a pair of STAs that intend to conduct directional transmissions to each other to conduct measurement while another pair of STAs is actively transmitting directionally. Subsequently, the PCP may request that the second pair of STAs conduct directional measurements while the first pair of STAs transmits directionally to each other. If both pairs of STAs report no or little interference from each others transmissions, the two pairs of STAs may be scheduled in the same service period (SP) to conduct concurrent directional transmissions.

Protection for STAs that are anticipated to operate in a sector may be set up by the AP using an omni-directional beam transmission for a duration within a TXOP to STAs within the sector. If the SO condition for one or more STAs is confirmed by an OBSS STA or AP, the OBSS STA or AP may reset its NAV to initiate a new SO exchange starting with a non-beamformed RTS/CTS.

To enable improved cell coverage and improve spectral efficiency, it is desirable to consider coordination between APs for joint and coordinated transmission to STAs. In particular, when each AP is equipped with multiple sectorized antennas to cover different sectors, it is beneficial to allow multiple APs transmit at the same time to each of its own STAs within their respective BSSs. Simultaneous transmission from multiple APs may improve the area spectrum efficiency of the underlying wireless network. Systems may be designed to guarantee that the multiple simultaneous transmissions do not interfere with each other at the receiver sides. Toward this objective, methods and devices may be required to enable multiple APs to coordinate with each other using sectorized antennas.

To enable improved cell coverage and improve spectral efficiency, it may be desirable to coordinate between APs for joint and coordinated transmission to STAs. For example, when each AP is equipped with multiple sectorized antennas to cover different sectors, it may be beneficial to allow multiple APs to transmit at the same time to a single STA. Simultaneous transmission from multiple APs to a single STA may improve the throughput or reliability to the STA and in turn improve the spectrum efficiency of the underlying wireless network. Systems may be designed to perform training, feedback and data transmission from the multiple APs with sectorized antennas to a single STA.

An AP1-STA1 communication may be referred to as the primary communication link, while the an AP2-STA2 communication may be referred to as the secondary communication link. In this example, AP1 may be the primary AP, STA1 may be the primary STA, AP2 may be the secondary AP, and STA2 may be the secondary STA. An AP that initiates a sectorization procedure may be referred to as the primary AP, which is AP1 in this example.

In IEEE 802.11ah, for example, type 1 sectorization may be defined to allow an OBSS AP/STA to transmit at the same time as the primary AP, on a condition that the SO checking is passed. Nevertheless, the SO checking may not be sufficient to guarantee that the new OBSS AP/STA transmission would not interfere with receiving at the primary STA. Accordingly, power control procedures may be needed, in addition to the SO condition checking, to assure that the OBSS AP/STA may not cause unintended interference while transmitting at the same time as the primary AP.

For non-sectorized IEEE 802.11 transmissions, an AP may perform clear channel assessment (CCA) before transmission. When a preamble is present, the CCA algorithm may indicate a busy channel with >90% probability within a 4 μs observation window when the signal is received at −82 dBm. Further, if a preamble is not present, the CCA algorithm may indicate a busy channel with >90% probability within a 4 μs observation window when the signal is received at −62 dBm. In both cases, the transmission may be omni-directional. For sectorized transmissions, the CCA may be used to take care of the transmit sectorization gain and the receive sectorization gain, which are potentially different.

In another IEEE 802.11ah example, type 1 sectorization for an AP may start a TXOP using an omni-beam transmission that may reach both STAs supporting type 1 sectorization, and STAs not supporting type 1 sectorization. The use of an omni-beam transmission may enable the setup of the NAV protection for the duration of subsequent sectorized beam transmission operations. During type 1 sectorization, a sectorized beacon may be used to configure operation for STAs in an active sector, for example, using a sectorized beacon type. STAs that do not support sectorized procedures or operations may not be capable of interpreting or using a sectorized beacon.

A non-sector-capable STA may operate while in the reception range of a sectorized transmission. For example, non-sector capable STAs or non-sector enabled STAs that are located outside, but within reception range, of one or more active sectors may receive prohibitive interference from these sectors. Procedures may be implemented for mitigating this interference.

FIG. 9 is a diagram of an example coordinated sectorized transmission 900. In this example, two neighboring APs 910, 920 may serve their own STAs 915, 925, respectively, at the same time, each with sectorized transmissions. For example, the communication between AP 910 and STA 920 may be the primary communication link, while the communication between AP 920 and STA 925 may be the secondary communication link. AP 910 may also be referred to as the primary AP, STA 915 may also be referred to as the primary STA. AP 920 may be referred to as the secondary AP, while STA 925 may be referred to as the secondary STA. The AP that initiated the procedure may be the primary AP, AP 910 in this example. In addition, the STA that is associated with the primary AP may be the primary STA, STA 915 in this example.

Referring to FIG. 9, AP 910 and AP 920 may transmit a null data packet announcement (NDPA) frame 911, 921, respectively, to announce that null data packet (NDP) frames from AP 910 and AP 920 may follow. This transmission may assist the intended STAs (STA 910 and STA 920) to initiate preparation for channel estimation and feedback later. This transmission may also assist to reserve the TXOP for the APs/STAs. For each AP, an NDPA frame may be transmitted using multiple sectors, or the NDPA frame may be transmitted using an omni-mode.

As shown in FIG. 9, AP 910 may transmit an NDP frame 912 a short interframe space (SIFS) duration 930 after the NDPA frame 911. NDP 912 may be used by STA 915 to estimate and select a proper transmit sectorization from AP 910. NDP frame 912 may also be used by STA 925 to estimate and test spatial orthogonality between AP 910 and STA 925.

As shown in FIG. 9, NDP frame 912 may be transmitted using the multiple transmit sectorization of AP 910. NDP frame 912 may be transmitted earlier than the time period shown in FIG. 9. In such a case, it may be assumed that the channel has not changed significantly since the previous NDP training was performed. AP 920 may transmit NPD frame 922 a SIFS duration 940 after NDP frame 912. NDP frame 922 may be used by STA 925 to estimate and select a proper transmit sectorization from AP 920. NDP frame 922 may also be used by STA 915 to estimate and test SO between AP 920 and STA 915.

As shown in FIG. 9, NDP frame 922 may be transmitted using multiple transmit sectorization of AP 920. AP 920 may transmit NDP 922 before AP 910 transmits NDP frame 912. In such a case, it may be assumed that the channel has not changed significantly since the previous NDP training was performed.

STA 915 may transmit a feedback packet 913 in response. The feedback packet from STA 915 may include the desired sector from AP 910. AP 910 may use the selected sector to transmit to STA 915. The feedback packet 913 from STA 915 may also include one or more desired sectors from AP 920. AP 920 and STA 915 may be SO if any of the desired sectors are used by AP 920. The feedback packet 913 from STA 915 may also include undesired sectors from AP 920. AP 920 and STA 915 may not be SO if any of the undesired sectors are used by AP 920. The feedback packet 913 from STA 915 may also be heard by STA 925. STA 925 may use the information in feedback packet 913 to infer the expected transmit sectorization from AP 915.

In an example where STA 915 is not heard by STA 925, AP 910 may transmit a sectorization confirmation signal to STA 915 and STA 925 to confirm which sector is to be used, and also to help STA 925 to check SO. The feedback packet 913 from STA 915 may also include the recommended modulation and code scheme (MCS) for AP 910. The recommended MCS from STA 915 may assist proper link adaptation in AP 910. The feedback packet 913 from STA 915 may also include the recommended transmit power for AP 910. The recommended transmit power from STA 915 may assist proper power control in AP 910. The primary STA, STA 915 in this example, may transmit the feedback packet 913 earlier than the secondary STA, STA 925 in this example. As indicated earlier, rules may be created for when the AP may be the primary AP and when the STA may be the primary STA. In the event that NDP frame 911 is transmitted earlier than the time period shown in FIG. 9, the feedback packet 913 may contain the sector ID information based on the earlier-transmitted NDP frames. In the event that the NDP frame 922 is transmitted earlier than the time period shown in FIG. 9, the feedback packet 913 may contain the sector ID information based on the earlier-transmitted NDP frames.

Referring still to FIG. 9, STA 925 may transmit a feedback packet 923. STA 925 may monitor the NDP transmission from AP 910, the NDP transmission from AP 920, and the feedback packet 913 from STA 915. STA 925 may infer the expected transmit sectorization from AP 910, based on the STA 915 selection. STA 925 may test if spatial orthogonality holds true between AP 910 and STA 925, if the sector chosen by STA 915 is used by AP 910. If spatial orthogonality is true between AP 910 and STA 925, STA 925 may transmit a good-to-go signal to AP 920 and, along with it, transmit the best transmit sector from AP 920, on the condition that the selected transmit sector is compatible with STA 915. For example, the selected transmit sector from AP 920 may guarantee spatial orthogonality between AP 920 and STA 915. STA 920 may transmit the selected MCS from AP 920, on the condition that the selected transmit sector guarantees spatial orthogonality between AP 920 and STA 915. This procedure may help proper link adaptation at the secondary AP. STA 925 may transmit the proper transmit power recommended for AP 920. This procedure may aid in proper power control at the secondary AP. In the event that the NDP frame 912 is transmitted earlier, the feedback packet may contain the sector ID information based on the earlier-transmitted NDP frames. In the event that the NDP frame 922 is transmitted earlier, the feedback packet may contain the sector ID information based on the earlier-transmitted NDP frames. If spatial orthogonality is false between AP 910 and STA 925, STA 925 may transmit a no-go signal to AP 920, implying that AP 920 transmission is prohibited due to interference from AP 910. AP 910 may proceed to transmit 950 to STA 915 using the selected transmit sectorization indicated in the feedback packet 913 from STA 915. If AP 920 receives a good-to-go signal from STA 925, AP 920 may use the selected transmit sectorization to transmit 960 to STA 925, in the same time period when AP 910 is transmitting to STA 915. If AP 920 receives a no-go signal from STA 925, AP 920 may determine not to transmit to STA 925. After the transmission 950 is completed, STA 915 may transmit an ACK packet 955 to acknowledge correct decoding of the signals from AP 910. If AP 920 transmits to STA 925 in the meantime, STA 925 may also transmit an ACK packet 965 to acknowledge correct decoding of the signals from AP 920.

FIG. 10 is a diagram of an example NDPA frame 1000 using multiple sectors that may be used in an omni-directional transmission. The NDPA frame 1000 may include multiple sector fields. For example, the NDPA frame 1000 may include a first field for sector 1 1010, a second filed for sector 2 1020, and so on, up to an N field for sector N 1030. Each sector field may be separated by a guard interval (GI) 1040, 1050, and 1060, respectively.

FIG. 11 is a diagram of an example NDP frame 1100 using multiple sectors that may be used in an omni-directional transmission. The NDP frame 1100 may include multiple sector fields. For example, the NDP frame 1100 may include a first field for sector 1 1110, a second filed for sector 2 1120, and so on, up to an N field for sector N 1130. Each sector field may be separated by a GI 1140, 1150, and 1160, respectively.

Figure 12:
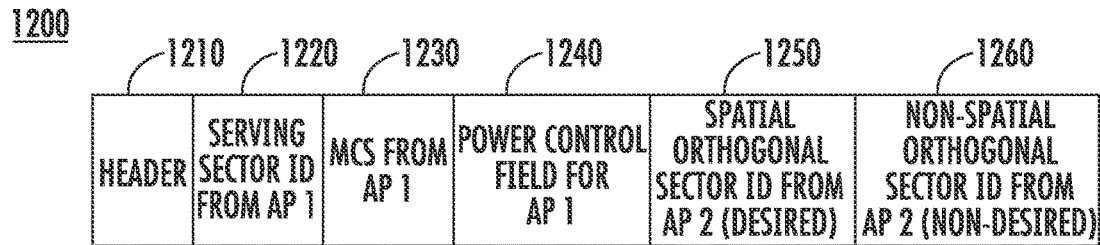
FIG. 12 is a diagram of an example feedback packet from a primary STA.

FIG. 12 is a diagram of an example feedback packet 1200 from a primary STA. The feedback packet 1200 may include a header 1210, a serving sector ID field 1220, an MCS field 1230, a power control field 1240, a spatial orthogonal sector ID field 1250, and a non-spatial orthogonal sector ID field 1260. The serving sector ID field 1220, MCS field 1230, and the power control field 1240 may be associated with a first AP. The spatial orthogonal sector ID field 1250 and the noon-spatial orthogonal sector ID field 1260 may be associated with a second AP. The spatial orthogonal sector ID field 1250 may identify a desired sector, and the non-spatial orthogonal sector ID field 1260 may identify a non-desired sector.

Figure 13:
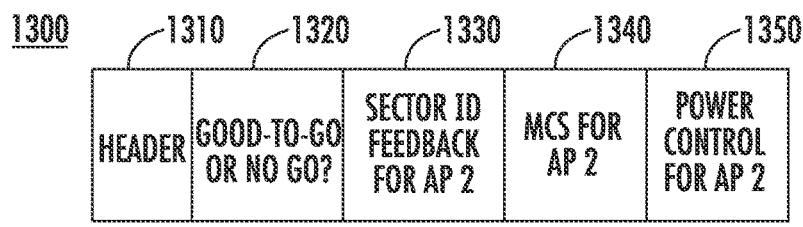
FIG. 13 is a diagram of an example feedback packet from a secondary STA.

FIG. 13 is a diagram of an example feedback packet 1300 from a secondary STA. The feedback packet 1300 may include a header 1310, a good-to-go or no-go field 1320, a sector ID feedback field 1330, an MCS field 1340, and a power control field 1350. The sector ID feedback field 1330, MCS field 1340, and power control field 1350 may be associated with a second AP.

The example shown in FIG. 9 may facilitate primary/secondary sectorization coordination by performing sectorization training first, followed by explicit sector ID feedback. An alternative procedure may also be used to achieve a similar purpose relying on implicit feedback and channel reciprocity, and is described below. In this example, it may be assumed that the AP-STA channel is the same as the STA-AP channel, when the same sectorized antenna is used for transmission and receiving respectively.

Figure 14:
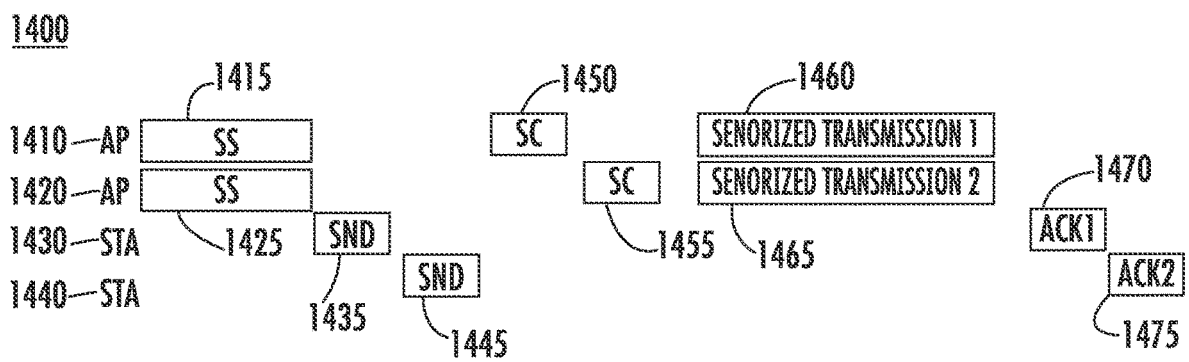
FIG. 14 is a diagram of an example alternative coordinated sectorized transmission.

FIG. 14 is a diagram of an example 1400 alternative coordinated sectorized transmission procedure. Referring to FIG. 14, AP 1410 and AP 1420 may each transmit a sounding solicitation (SS) frame 1415, 1425, respectively. The SS frames 1415, 1425 may solicit sounding frames from STA 1430 and STA 1440, respectively. For each AP 1410, 1420, the SS frame 1415, 1425 may be transmitted using multiple sectors. The SS frame may be transmitted at the same time, or one after another in time. In this example, STA 1430 may transmit a sounding (SND) frame 1435 in response to SS frame 1415 and/or SS frame 1425. The SND frame 1435 may be used to facilitate uplink channel estimation and sector training in AP 1410. The SND frame 1435 may also be used to facilitate SO detection in AP 1420.

The AP 1410 receiver may sweep different sectors during this procedure. For example, the AP 1410 receiver may use sector 1 to receive during the first repetition period of the SND frame 1435, use sector 2 to receive during the second repetition period of the SND frame 1435, use sector 3 to receive during the third repetition period of the SND frame 1435, and use sector 4 to receive during the fourth repetition period of the SND frame 1435. Different automatic gain controls (AGCs) may be used for different repetitions of the SND frame 1435.

STA 1440 may transmit a SND frame 1445 in response to the SS frame 1415 and/or the SS frame 1425. The SND frame 1445 may be used to facilitate uplink channel estimation and sector training in AP 1420. The SND frame 1445 may also be used to facilitate SO detection in AP 1410. The SND frame 1445 may be repeated multiple times.

The AP 1420 receiver may sweep different sectors during this procedure. For example, the AP 1420 receiver may use sector 1 to receive during the first repetition period of the SND frame 1445, use sector 2 to receive during the second repetition period of the SND frame 1445, use sector 3 to receive during the third repetition period of the SND frame 1445, and use sector 4 to receive during the fourth repetition period of the SND frame 1445. Note that different AGCs may be used for different repetitions of the SND frame 1445. SND frame 1435 may be transmitted earlier than SND frame 1445, or later.

AP 1410 may transmit a sounding confirmation (SC) frame 1450. The SC frame 1450 may indicate the sector ID S(1,1) to be used by AP 1410 to serve STA 1430, based on channel estimation from STA 1430 to AP 1410. The SC frame 1450 may also indicate whether STA 1440 is spatially orthogonal to AP 1410, when the above sector ID S(1,1) is to be used by AP 1410. If STA 1440 is SO to AP 1410 with the selected sector S(1,1), then AP 1420 may proceed with transmission to STA 1440. If STA 1440 is not SO to AP 1410 with the selected sector S(1,1), then AP 1420 may not proceed with transmission to STA 1440.

If STA 1440 is SO to AP 1410 with the selected sector S(1,1), then AP 1420 may transmit SC frame 1455. The SC frame 1455 may include the selected sector S(2,2) to be used by AP 1420, on the condition that the selected sector S(2,2) guarantees spatial orthogonality between AP 1420 and STA 1430. This may be obtained by AP 1420 by monitoring the sounding frame to STA 1430. If STA 1420 is not SO to AP 1410 with the selected sector S(1,1), then AP 1420 may transmit SC frame 1455, confirming that it is not going to transmit to STA 1440.

The sectorized transmission 1 1460 may begin, with sector S(1,1) as the selected sector from AP 1410. The sectorized transmission 2 1465 may also begin, with S(2,2) as the selected sector from AP 1420, on the condition that S(1,1) assures spatial orthogonality between AP 1410 and STA 1440, and that S(2,2) assures spatial orthogonality between AP 1420 and STA 1430. After the transmission is completed, STA 1430 may transmit an ACK packet 1470 to acknowledge correct decoding of the signals from AP 1410. If AP 1420 transmits to STA 1440 in the meantime, STA 1440 may also transmit an ACK packet 1475 to acknowledge correct decoding of the signals from AP 1420.

Figure 15:
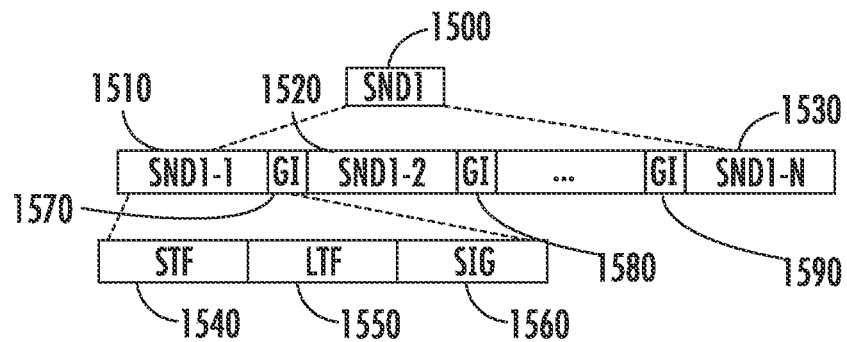
FIG. 15 is a diagram of an example sounding frame packet.

FIG. 15 is a diagram of an example SND frame 1500 shown in FIG. 14. As shown in FIG. 15, the SND frame 1500 may be repeated multiple times. Each copy 1510, 1520, 1530 of the SND frame 1500 may be a null data packet, and may not contain MAC level data. Each copy 1510, 1520, 1530 of the SND frame 1500 may contain a short training field (STF) 1540 and a long training field (LTF) 1550 to perform an automatic gain control (AGC) adjustment, frequency and time synchronization, as well as channel measurements such as channel estimation. Each copy 1510, 1520, 1530 of the SND frame 1500 may include a signal (SIG) field 1560. Each copy 1510, 1520, 1530 of the SND frame 1500 may be separated by a GI 1570, 1580, 1590.

The SO condition may be considered in 802.11ah for sectorized transmission. The SO condition may be satisfied if an OBSS STA or AP receives the omni-directional transmission, but does not receive the subsequent sectorized beam transmission from the AP, and/or does not receive the transmission from the STA involved in the frame exchange. Different types of frame exchange sequences may lead to the SO condition. FIGS. 3-7 show example SO conditions that may be used in 802.11ah. The frame exchange sequences may focus on an existing pair of transmissions, and may use an SO condition that may be confirmed by a third STA/AP. The third STA/AP may be an OBSS STA/AP and may begin another spatially orthogonal transmission.

Example rules and procedures of SO transmission initiated by the third OBSS STA/AP may be implemented. For example, the original pair of AP and STA that are shown in FIGS. 3-7 may be denoted as AP1 and STA1. The OBSS AP and STA that may confirm the SO condition before transmission may be denoted as AP2 and STA2. The transmission between AP2 and STA2 in this example may be referred to as a conditional SO transmission.

Figure 16:
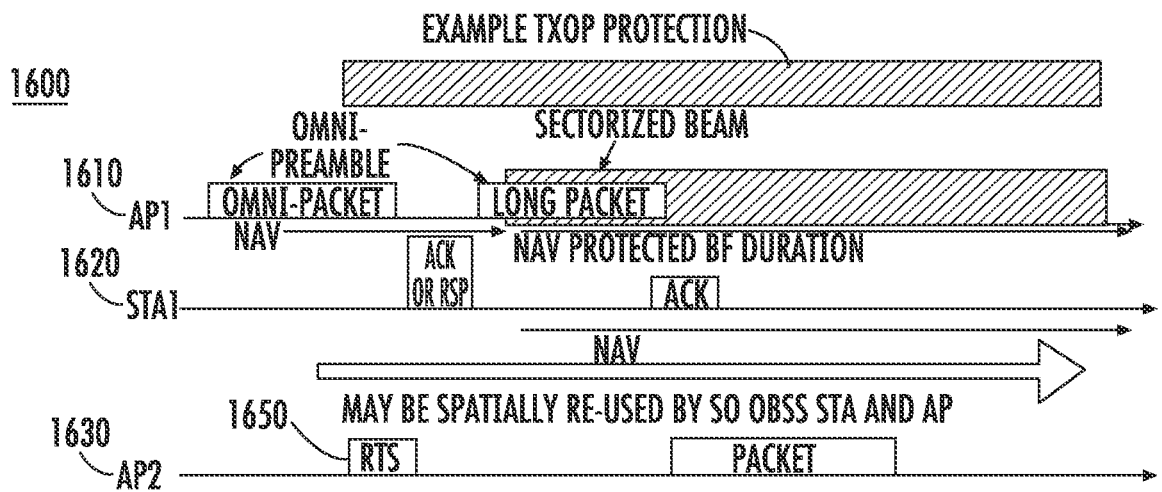
FIG. 16 is a diagram of an example SO transmission between an access point (AP) and a STA when an SO condition is confirmed.

FIG. 16 is a diagram of an example 1600 SO transmission between an AP and a STA when an SO condition may be confirmed by using an exchange sequence 1 between AP1 1610 and STA1 1620. A frame exchange sequence 1, for example in 802.11ah, may serve as an example for an SO condition confirmation. This example may be extended when other possible frame exchanges are utilized. An SO condition may be confirmed by an OBSS STA/AP that receives the omni-directional transmission of the AP, but does not receive the beamformed or sectorized transmission of the AP, and/or does not receive the transmission of the STA. During the omni-transmission period between AP1 1610 and STA1 1620, AP2 1630 may listen and confirm the SO condition. In the meantime, AP2 1630 may receive the omni-transmission from AP1 1610 and check the NAV setting for the rest of sectorized transmission between AP1 1610 and STA1 1620.

If AP2 1630 plans to transmit during the sectorized transmission between AP1 1610 and STA1 1620, AP2 1630 may calculate the outgoing packet duration and truncate the packet if it is longer than the NAV period. After confirming the SO condition, AP2 1630 may begin transmission to one of the associated STAs in its BSS, for example, STA2 1640. AP2 1630 may use the same antenna pattern for detecting the SO condition and conducting the conditional SO transmission. AP2 1630 may use a sectorized antenna pattern to monitor/receive the omni-directional transmission between AP1 1610 and STA1 1620. AP2 1630 may use the same sectorized antenna pattern for the following conditional SO transmission. AP2 1630 may use an omni-directional antenna pattern to monitor/receive the omni-directional transmission between AP1 1610 and STA1 1620. AP2 1630 may use the omni-directional antenna pattern for the following conditional SO transmission.

AP2 1630 may determine whether STA2 1640 confirms the SO condition. This may be performed by exchanging RTS/CTS sequences, for example RTS frame 1650 and CTS frame 1660, between AP2 1630 and STA2 1640. The RTS/CTS frames may be modified to signal that the following transmissions are the conditional SO transmission. One or more bits indicating conditional SO transmission may be transmitted in a SIG field, MAC header or MAC body of RTS/CTS frames. The MAC address of AP1 1610 and STA1 1620, or other information indicating the transmission of AP1 1610 and STA1 1620 may be included in the RTS frame 1650. In this way, STA2 1640 may have a view of which SO condition to confirm and which NAV setting it may ignore.

The transmission of an RTS frame 1650 may utilize the same antenna pattern as when AP2 1630 confirms the SO condition. Alternatively, the transmission of an RTS frame 1650 may utilize a different antenna pattern as when AP2 1630 confirms the SO condition. Before transmitting the RTS frame 1650, AP2 1630 may perform a backoff a distributed coordination function (DFS) interframe space (DIFS) duration prior to the beginning of the sectorized transmission from AP1 1610. An extra time duration may be defined to allow AP2 1630 and other OBSS STAs to confirm that they cannot receive the sectorized transmission from AP1 1610. Accordingly, AP2 1630 may transmit DIFS+extra time duration+backoff prior to the beginning of the sectorized transmission.

STA2 1640 may reply with a CTS frame 1660 although it may set its NAV according to the omni packet transmitted by AP1 1610 if the conditional SO transmission bit is detected in the RTS frame 1650. STA2 1640 may confirm the SO condition prior to transmitting the CTS frame 1660. AP2 1630 may then begin sectorized or omni data transmission to STA2 1640 using the same antenna pattern as when AP2 1630 confirms the SO condition. The duration of the packet transmitted from AP2 1630 and also the expected ACK frame 1670 from STA2 1640, if any, may be shorter than the NAV setting announced by AP1 1610 for the SO condition. In one example, the AP2 1630 may guarantee that the transmission will be terminated before the end of the NAV set by AP1 1610 and STA1 1620.

In the above example, AP2 1630 may be an OBSS AP, and may initiate the conditional SO transmission. In a more general example, both OBSS AP or STA may initiate the conditional SO transmission. In the above example procedure, a conditional SO indicator may be added to the RTS frame 1650 and CTS frame 1660 exchanged between AP2 1630 and STA2 1640 such that the responder, STA2 1640 in this example, may reset the NAV previously set by the omni-directional transmission from AP1 1610. An alternative method may be to allow all the OBSS APs and STAs to reset the NAV to zero if they confirm the SO condition. Accordingly, all the OBSS APs and STAs may initiate or respond to a conditional SO transmission.

FIG. 17 is a diagram of an example 1800 cooperative sectorized (CS) transmission. Procedures for training, feedback and data transmission may be used where multiple WiFi APs with sectorized antennas cooperate and transmit data to a single STA in the spatial and frequency domains to improve area throughput.

A network may identify sector pairs across different APs suitable for CS transmission. When a STA joins a network with the ability for cooperative sectorization, it may indicate that it supports multiple AP association and cooperative sectorization during the sector capabilities exchange with its primary BSS. The STA may transmit a probe request to the network. In this example, AP1 1710 and AP2 1720 may transmit probe responses with multiple AP association and cooperative sectorization capability set to true. The STA 1730 may transmit an association request aggregated with a capability frame with the multiple AP association and cooperative sectorization capability set to true, AP1 1710 set as the primary AP and AP2 1720 set as the secondary AP. This association request may indicate to the network that data for the STA 1730 may be sent to both AP1 1710 and AP2 1720 on the distribution system (DS) or by a direct link between AP1 1710 and AP2 1720 if available.

The STA 1730 may feedback the best sector ID for each AP. STA-requested multi-AP training and feedback may be implemented by AP-directed single AP training and feedback.

FIG. 18 is a diagram of an example 1800 STA-requested multi-AP training and feedback procedure. The STA 1810 may initiate the sector training requests for both APs. For example, the STA 1810 may transmit a sector training request 1835 heard by both AP1 1820 and AP2 1830. AP1 1820 may set up a TXOP 1840 in BSS1 long enough for NDP transmissions from each sector in the BSS for both BSS1 and BSS2. This example may imply that AP1 1820 may know the number of sectors in AP2 1830 and the time needed for AP2 1830 to complete its sector training. AP2 1830 may set up a TXOP in BSS2 long enough for NDP transmissions 1860 from each sector in the BSS for both BSS1 and BSS2. This may imply that AP2 1830 may know the number of sectors in AP1 1820 and the time needed for AP1 1820 to complete its sector training.

AP1 1820 may initiate its sector training/discovery procedure by transmitting an NDP announcement 1855, then a series of NDPs 1857, one for each sector to be discovered. On completion of the sector training for AP1 1820, STA 1810 may transmit an ACK 1870 or a sector ID feedback frame.

AP2 1830 may overhear the ACK 1870 from the STA 1810 and initiate its sector training procedure. AP2 1830 may transmit an NDP announcement 1865, then a series of NDPs 1867, one for each sector to be discovered. On completion of the sector training for AP2 1830, STA 1810 may transmit an ACK 1870 or a sector ID feedback frame 1880. The sector ID feedback frame 1880 may be an aggregated frame with AP1:Sector1ID, AP2:Sector2ID. Alternatively, the STA 1810 may store the sector ID for the secondary STA and feed it back during the CS transmission procedure.

Figure 19:
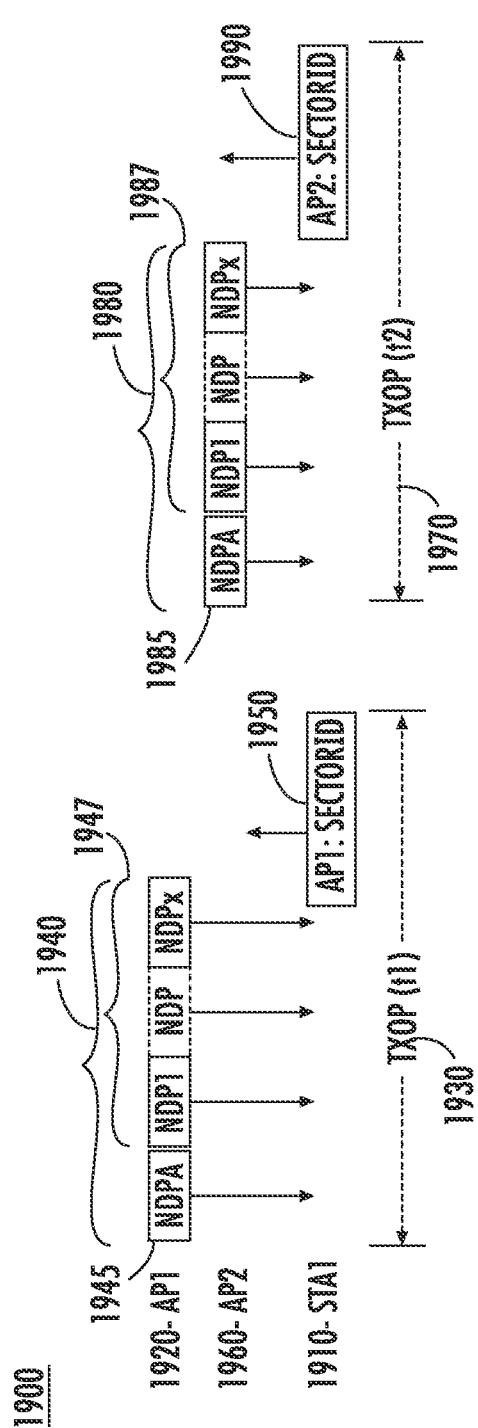
FIG. 19 is a diagram of an example AP-directed single AP training and feedback procedure.

FIG. 19 is a diagram of an example 1900 AP-directed single AP training and feedback procedure. In this example, the STA 1910 may listen to independent sector feedback procedures from each AP and feedback the desired sector ID using a sector ID feedback frame to the AP in the sector training mode. AP1 1920 may setup a TXOP 1930 in BSS1 long enough for NDP transmissions 1940 from each sector in the BSS1 at time t1. AP1 1920 may transmit an NDP announcement 1945, then a series of NDPs 1947, one for each sector to be discovered. On completion of the sector training for AP1 1920, STA 1910 may transmit a sector ID feedback frame 1950. AP2 1960 may setup a TXOP 1970 in BSS2 long enough for NDP transmissions 1980 from each sector in the BSS1 at time t2. AP2 1960 may transmit an NDP announcement 1985, then a series of NDPs 1987, one for each sector to be discovered. On completion of the sector training for AP2 1960, STA 1910 may send a sector ID feedback frame 1990.

A modified sector feedback frame that feeds back all valid AP x and sector ID y may be used. The times t1 and t2 may be coordinated to reduce the amount of interference in the network and improve the sector discovery procedure. The STA may be associated to each AP and be able to compete for resources in each AP to feedback the desired sector ID. Alternatively, the STA may store the sector ID for the secondary STA and feed it back during the CS transmission procedure.

Figure 20:
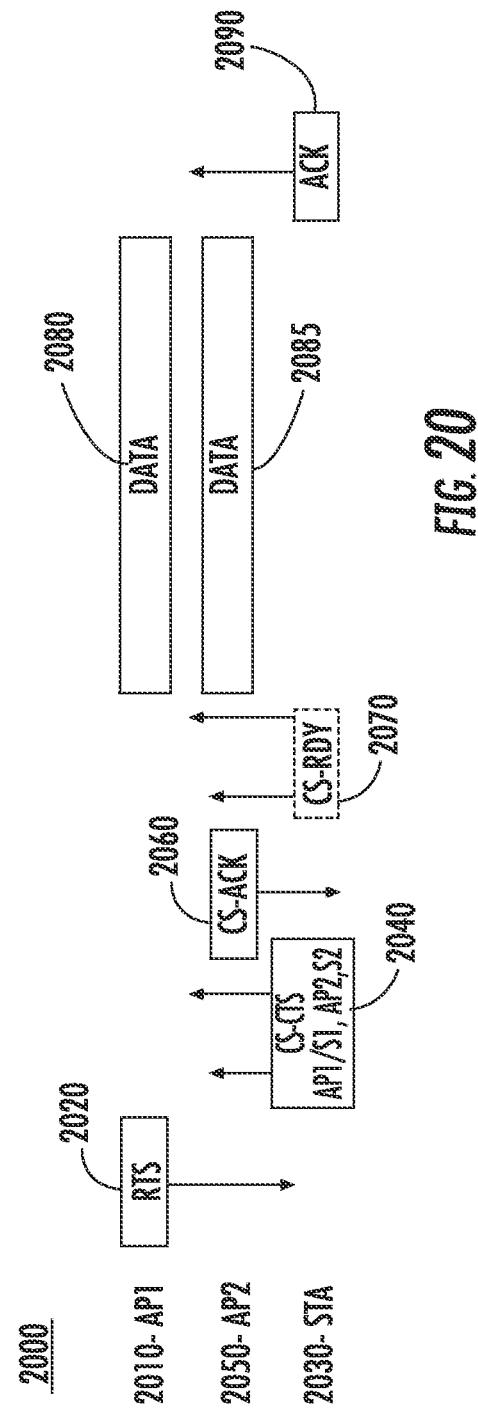
FIG. 20 is a diagram of an example STA initiated CS transmission.

FIG. 20 is a diagram of an example 2000 STA initiated CS transmission. Multiple APs may transmit information to a single STA in a sectorized multi-AP network. The transmission may be STA initiated in which the STA requests a CS transmission or the transmission may be AP-initiated in which the AP requests a CS transmission. It may be assumed that the APs, sectors and STAs involved in this procedure have been pre-selected.

In a STA initiated CS transmission, AP1 2010 may transmit a normal RTS frame 2020 to the STA 2030 indicating data is available for transmission. The STA 2030 may reply with a CS-CTS frame 2040 indicating an ability for multi-AP reception. The CS-CTS frame 2040 may include a CS transmission flag that may work with the assumption that the APs and sectors that will be used for the CS transmission are known. Alternatively, the CS-CTS frame 2040 may include information on the APs/Sectors discovered by the STA 2030 during the sector discovery process. This information may include the actual APs to be used, in this example 2 AP/sector pairs, or may include all candidate APs/sectors that may be used.

In an AP directed CS transmission, the AP1 2010 may transmit a CS transmission desired flag to the STA 2030 with a CS-RTS frame (not shown). The STA 2030 may reply with a CS-CTS frame (not shown), informing AP2 2050 that a CS transmission is desired. AP2 2050 may transmit a CS-ACK frame 2060 to indicate to the STA 2030 that it is available for multi-AP cooperative sectorized transmission.

The STA 2030 may transmit a CS transmission ready (CS-RDY) frame 2070 to AP1 2010 and AP2 2050 to indicate readiness to accept data. AP1 2010 and AP2 2050 may transmit data 2080, 2085, respectively, to the STA 2030 on the desired sectors. The data 2080, 2085 may be transmitted as independent streams increasing the throughput of the transmission. The data 2080, 2085 may be transmitted as identical streams with an additional frequency rotation, for example cyclic stream diversity, to improve the reliability of the transmission. The STA 2030 may transmit an ACK frame 2090 to AP1 2010 and/or AP2 2050.

Figure 21:
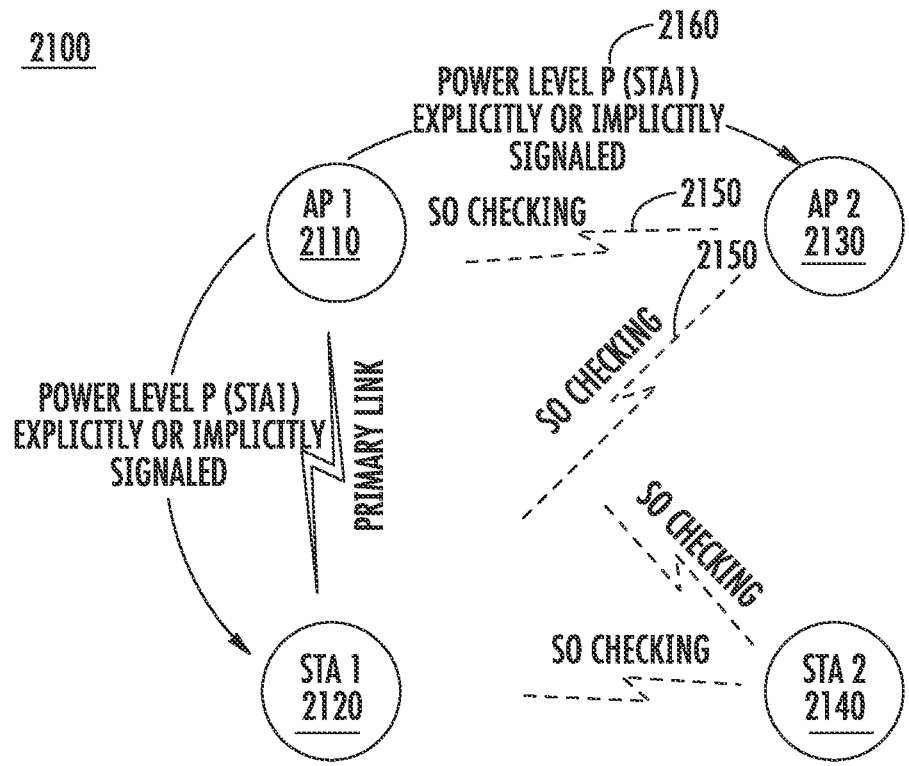

FIG. 21 is a diagram of an example procedure 2100, where an AP may be configured to set its transmit power to ensure that a STA is not interfered with. The STA transmit power, for example, may be unknown for SO in IEEE 802.11ah. Accordingly, an OBSS AP may mistakenly conclude that it is spatially orthogonal to the primary AP/STA, while it is actually not. Power control methods may guarantee that the spatial orthogonality condition checking is sufficient. When AP1 2110 and STA1 2120 are the primary AP and STA, AP2 2130 and STA2 2140 may be the OBSS AP and OBSS STA. AP1 2110 may initiate a sectorized transmission to STA1 2120, while at the same time AP2 2130 may monitor 2150 if it is spatially orthogonal to AP1 2110 and STA1 2120. If AP2 2130 is spatially orthogonal to AP1 2110, and AP2 2130 is spatially orthogonal to STA1 2120, then AP2 2130 may initiate a new transmission with at least STA2 2140 (or others), even while the AP1-STA1 transmission is ongoing.

The spatial orthogonality condition for AP1 2110, AP2 2130 spatial orthogonality may be defined such that AP2 2130 is able to receive the omni-packet transmission from AP1 2110, and AP2 2130 is not able to receive the directional transmission from AP1 2110. Both conditions may be met to satisfy the SO condition. On the other hand, the SO condition for STA1 2120 may be defined such that AP2 2130 is not able to receive the transmissions from STA1 2120.

P(AP1, omni) may be the AP1 transmit power during the omni-transmission stage, P(AP1, directional) may be the AP1 transmit power during sectorized transmission stage, P(STA1) may be the transmit power used by STA1 2120, and P(AP2) may be the AP2 transmit power to be used by AP2 2130 if SO condition is met and AP2 2130 plans to start a concurrent transmission. P(STA1) may be used by AP2 2130 to enable proper transmit power setting at AP2 2130. Otherwise, if P(AP2) is larger than P(STA1), STA1 may be interfered by AP2 2130 even if spatial orthogonality is satisfactory.

The following procedure may be used to guarantee proper power control for SO transmissions. Referring to FIG. 21, AP1 2110 may initiate the transmissions starting with an omni-transmitted packet 2160, using transmit power P(AP1, omni). Within this omni-transmitted packet 2160, AP1 2110 may signal to AP2 2130 explicitly or implicitly the transmit power to be used by STA1 2120, for example P(STA1). If signaled explicitly, P(STA1) may be represented by a number of bits and may be decoded by both STA1 2120 and AP2 2130. If signaled implicitly, P(STA1) may be a nominal transmit power (agreed upon by all STAs within the network) and may be understood by both STA1 2120 and AP2 2130. Either way, P(STA1) may be obtained by AP2 2130 for future use. STA1 2120 may transmit some response packets, using the transmit power indicated by P(STA1). AP1 2110 may continue with an omni-transmitted short packet, using the same transmit power P(AP1, omni). AP1 2110 may continue with sectorized transmissions P(AP1, directional). AP2 2130 may monitor the transmissions from AP1 2110 and STA1 2120. If both AP1-AP2 SO condition and STA1-AP2 SO condition hold true, AP2 2130 may initiate a new transmission. AP2 2130 may use a transmit power P(AP2) no larger than P(STA1), which may be obtained at AP2 2130. The transmit power P(AP2) may be set less than or equal to P(STA1) to guarantee the spatial orthogonality. Without this setting, the SO checking may be erroneous.

For normal 802.11 transmissions without using spatial orthogonal sectorized transmissions, if AP2 2130 has a packet to transmit, it may perform CCA before transmission whereby when a preamble is present, the CCA algorithm may indicate a busy channel with >90% probability within a 4 μs observation window when the signal is received at −82 dBm. If a preamble is not present, the CCA algorithm may indicate a busy channel with >90% probability within a 4 μs observation window when the signal is received at −62 dBm.

Figure 22:
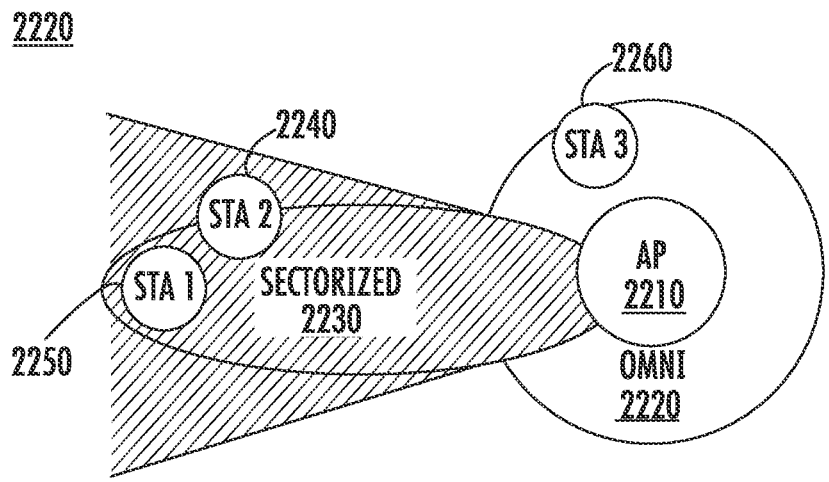
FIG. 22 is a diagram of an example sectorized clear channel assessment (CCA) and omni-directional CCA.

FIG. 22 is a diagram of an example 2200 sectorized clear channel assessment (CCA) and omni-directional CCA procedure. CCA requirements may be defined to avoid interference or collision for sectorized transmissions. In sectorized transmissions, power may vary based on the direction of the transmissions. Hence, an adaptively adjusted CCA level based on effective isotropically radiated power may be desirable. Effective isotropically radiated power (EIRP) may be the amount of power that a theoretical isotropic antenna, which evenly distributes power in all directions, may emit to produce the peak power density observed in the direction of maximum antenna gain, where:

$$EIRP=Pt+Ga, \quad \quad \quad \text{Equation (1)}$$

where Pt may be the transmitted power, and Ga may be the antenna gain in a specific direction.

For example, an AP 2210 may be capable of omni-directional transmissions 2220 as well as sectorized transmission 2230. During omni-transmissions 2220, the EIRP may be equal to Pt, assuming a 0 dB antenna gain. During sectorized transmission 2230, EIRP may be equal to Pt+Ga. As the EIRP is increased, transmission range of AP 2210 may also increase. STA2 2240, which may not hear the AP 2210 in the omni-directional transmission 2220, may hear the AP 2210 while it is transmitting to STA1 2250. If STA2 2240 had an ongoing transmission with another AP/STA, there may be a collision.

To avoid this situation, sectorized CCA may be performed with increased sensitivity. For example, the CCA sensitivity for omni-directional transmission may be −82 dBm for preamble detection and −62 dBm for energy detection without preambles. When sectorized transmissions are used with an antenna gain Ga, CCA sensitivity may be (−82−Ga) dBm for preamble detection, (i.e., the CCA algorithm may indicate a busy channel with >90% probability within a 4 μs observation window when the signal is received at (−82−Ga) dBm). If an omni-receive antenna is used, a more sensitive CCA detection algorithm may be used. Alternatively, if a sectorized receive antenna is used with sectorization gain Ga dB, the same CCA detection algorithm may be used.

When sectorized transmissions are used with an antenna gain Ga dB, CCA sensitivity may be (−62−Ga) dBm for energy detection, (i.e., the CCA algorithm may indicate a busy channel with >90% probability within a 4 μs observation window when the signal is received at (−62−Ga) dBm for energy detection). If an omni-receive antenna is used, a more sensitive CCA detection algorithm may be used. Alternatively, if a sectorized receive antenna is used with sectorization gain Ga dB, the same CCA detection algorithm may be used.

The receiver CCA algorithm may perform a regular CCA assuming an omni-directional receive antenna to complete energy detection at −62 dBm within 4 μs and complete preamble detection at −82 dBm within 4 μs. By using the regular CCA, any omni-directional transmission from the AP/STA may not cause interference to other potential users. For example, use of this regular CCA may prevent interference to STA3 2260, which is located within the omni-range of the AP 2210, but not within the directional-range of the AP 2210.

The receiver CCA algorithm may then perform a directional CCA. An omni-directional receive antenna may be used. Accordingly, the detection algorithm may be improved by Ga dB.

If a preamble is present, the improved CCA algorithm may indicate a busy channel with >90% probability within a 4 μs observation window when the signal is received at −(82+Ga) dBm. If a preamble is not present, the improved CCA algorithm may indicate a busy channel with >90% probability within a 4 μs observation window when the signal is received at −(62+Ga) dBm.

A directional receive antenna may be used. Accordingly, the original CCA detection algorithm may be used. If a preamble is present, the CCA algorithm (with extra Ga dB receive antenna gain) may indicate a busy channel with >90% probability within a 4 μs observation window when the signal is received at −(82+Ga) dBm. If a preamble is not present, the CCA algorithm (with extra Ga dB receive antenna gain) may indicate a busy channel with >90% probability within a 4 μs observation window when the signal is received at −(62+Ga) dBm.

Use of the directional CCA may prevent any directional transmission from causing unintended interference to far-away users in the direction of transmission. For example, use of such a directional CCA may prevent interference to STA2 2240, which is located within the directional-range of the AP 2210, but not omni-range of the AP 2210. Similarly, if an antenna array is used at the AP side to provide the extra transmitter side antenna gain, a similar CCA may be used.

In certain cases, it may be beneficial to perform transmit power control during sectorized transmissions such that the directional transmission range is comparable to the omni-transmission range. For example, if Pt1 is the transmit power during omni-transmissions, and Pt2 be the transmit power during sectorized transmissions while Gt is the antenna gain during sectorized transmissions, it may be beneficial to have Pt1=Pt2+Gt such that the same CCA is used for both omni-directional transmissions as well as sectorized transmissions.

Methods may be implemented for STAs that do not support sectorized operation and are in an active sector. An omni-directional beam transmission may be used to facilitate protection of STAs in a sector that may be anticipated for subsequent operation in the active sector. STAs that do not support sectorized procedures may be able to receive omni-beam transmissions from the AP which are intended to protect STAs that do support sectorized operation. STAs that receive this transmission, and do not support sectorized operation, may follow one or more of the following procedures to mitigate their operation in a sector that may degrade their performance.

A STA operating in a BSS that receives a omni-beam transmission from the AP indicating the potential for subsequent sectorized operation may respond to the AP indicating the lack of capability for sectorized operation. An indication for lack of support for sectorization may be indicated by setting the sectorization type to 3. The STA may also, or instead, provide to the AP an indication of its capabilities. The STA may follow this transmission with a short CTS NDP packet which may allow the AP to determine the quality of reception at this STA. The STA may also, or in addition, provide an indication to the AP of its reception quality.

A STA operating in a BSS that receives an omni-beam transmission from the AP indicating the potential for subsequent sectorized operation may respond with an indication of the suitability for sectorization, and in addition provide a group ID indication. An indication of the suitability for use of sectorization by one or more STAs may include an indication of the neighbor report capability to provide an AP the ability to request a measurement request element.

FIG. 23 is a diagram of an example measurement request response field 2300. A measurement request response field 2300 may include an operating class element 2310, a channel number element 2320, a randomization interval element 2330, a measurement duration element 2340, a sector ID element 2350, and one or more optional subelements 2360. A STA may respond to a measurement request which contains a channel load request for a specific sector ID by responding with a measurement (channel load) report element for a specific sector ID.

A STA may respond to a measurement request that contains a noise histogram request for a specific sector ID by providing the measurement request response field of FIG. 23.

FIG. 24 is a diagram of an example STA statistics request response field 2400. The STA statistics request response field 2400 may include a peer MAC address element 2410, a randomization interval element 2420, a measurement duration element 2430, a group identity element 2440, a sector ID element 2450, and one or more optional subelements 2460. A STA may respond to a statistics request for a specific sector ID by providing the STA statistics request response field of FIG. 24.

Although the solutions described herein consider IEEE 802.11 specific protocols, it is understood that the solutions described herein are not restricted to this scenario and are applicable to other wireless systems as well.

Although the solutions in this document have been described for uplink operation, the methods and procedures may also applied to downlink operation.

Although SIFS is used to indicate various inter frame spacing in the examples of the designs and procedures, all other inter frame spacing such as RIFS or other agreed time interval may be applied in the same solutions.

Although features and elements are described above in particular combinations, one of ordinary skill in the art will appreciate that each feature or element may be used alone or in combination with any of the other features and elements. In addition, the embodiments described herein may be implemented in a computer program, software, or firmware incorporated in a computer-readable medium for execution by a computer or processor. Examples of computer-readable media include electronic signals, (transmitted over wired or wireless connections), and computer-readable storage media. Examples of computer-readable storage media include, but are not limited to, a read only memory (ROM), a random access memory (RAM), a register, a cache memory, a semiconductor memory device, a magnetic media, (e.g., an internal hard disc or a removable disc), a magneto-optical media, and an optical media such as a compact disc (CD) or a digital versatile disc (DVD). A processor in association with software may be used to implement a radio frequency transceiver for use in a WTRU, UE, terminal, base station, Node-B, eNB, HNB, HeNB, AP, RNC, wireless router or any host computer.

What is claimed is:

1. A method for use in a station (STA), the method comprising:
   receiving a first null data packet announcement (NDPA) frame from a first access point (AP) and a second NDPA frame from a second AP, wherein the first AP is a primary AP that the STA is not associated with and the second AP is a secondary AP that the STA is associated with;
   receiving, subsequent to the first NDPA frame, from the first AP, a first NDP frame used to select a first sector from among a plurality of sectorized transmissions from the first AP;
   receiving, subsequent to the second NDPA frame, from the second AP, a second NDP frame used to select a second sector from among a plurality of sectorized transmissions from the second AP;
   receiving, from the first AP, a sectorization confirmation signal indicating the first sector to be used by the first AP; and
   transmitting, subsequent to the sectorization confirmation signal, a feedback frame that includes a sector identity corresponding to the second sector that is determined based on the first sector.

2. The method of claim 1, further comparing:
   receiving, from another STA, another feedback frame that includes another sector identity determined based on the first sector.

3. The method of claim 2, wherein the sectorization confirmation signal is received at the STA on a condition that the another feedback frame from the another STA is not received at the STA.

4. The method of claim 1, further comprising:
   receiving, from the second AP, based on the second sector, a sectorized transmission while another sectorized transmission from the first AP is directed to another STA.

5. The method of claim 4, further comprising:
   determining, based on the sectorization confirmation signal indicating the first sector to be used by the first AP, that the STA and the first AP are spatially orthogonal.

6. The method of claim 1, wherein the first NDP frame is received Short Interframe Space (SIFS) duration after the first NDPA frame is received.

7. The method of claim 1, wherein the second NDP frame is received Short Interframe Space (SIFS) duration after the first NDP frame is received.

8. A station (STA) comprising:
   a receiver configured to:
      receive a first null data packet announcement (NDPA) frame from a first access point (AP) and a second NDPA frame from a second AP, wherein the first AP is a primary AP that the STA is not associated with and the second AP is a secondary AP that the STA is associated with;
      receive, subsequent to the first NDPA frame, from the first AP, a first NDP frame used to select a first sector from among a plurality of sectorized transmissions from the first AP;
      receive, subsequent to the second NDPA frame, from the second AP, a second NDP frame used to select a second sector from among a plurality of sectorized transmissions from the second AP; and
      receive, from the first AP, a sectorization confirmation signal indicating the first sector to be used by the first AP; and
   a transmitter configured to transmit, subsequent to the sectorization confirmation signal, a feedback frame that includes a sector identity corresponding to the second sector that is determined based on the first sector.

9. The STA of claim 8, wherein the receiver is configured to receive, from another STA, another feedback frame that includes another sector identity determined based on the first sector.

10. The STA of claim 9, wherein the sectorization confirmation signal is received at the STA on a condition that the another feedback frame from the another STA is not received at the STA.

11. The STA of claim 8, wherein the receiver is configured to receive, from the second AP, based on the second sector, a sectorized transmission while another sectorized transmission from the first AP is directed to another STA.

12. The STA of claim 11, further comprising:
   a processor configured to determine, based on the sectorization confirmation signal indicating the first sector to be used by the first AP, that the STA and the first AP are spatially orthogonal.

13. The STA of claim 8, wherein the first NDP frame is received Short Interframe Space (SIFS) duration after the first NDPA frame is received.

14. The STA of claim 8, wherein the second NDP frame is received Short Interframe Space (SIFS) duration after the first NDP frame is received.

* * * * *